(12) United States Patent
Takahashi et al.

(10) Patent No.: US 12,223,656 B2
(45) Date of Patent: Feb. 11, 2025

(54) INDIVIDUAL IDENTIFICATION SYSTEM

(71) Applicant: NEC Corporation, Tokyo (JP)

(72) Inventors: Toru Takahashi, Tokyo (JP); Kengo Makino, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 17/639,791

(22) PCT Filed: Mar. 27, 2020

(86) PCT No.: PCT/JP2020/013992
§ 371 (c)(1),
(2) Date: Mar. 2, 2022

(87) PCT Pub. No.: WO2021/192216
PCT Pub. Date: Sep. 30, 2021

(65) Prior Publication Data
US 2022/0335617 A1    Oct. 20, 2022

(51) Int. Cl.
| | | |
|---|---|---|
| G06T 7/11 | (2017.01) | |
| G06T 7/33 | (2017.01) | |
| G06T 7/37 | (2017.01) | |

(52) U.S. Cl.
CPC .............. G06T 7/11 (2017.01); G06T 7/33 (2017.01); G06T 7/37 (2017.01); *G06T 2207/20056* (2013.01)

(58) Field of Classification Search
CPC ..... G06T 7/11; G06T 7/33; G06T 7/37; G06T 2207/2005; G06T 2207/30164; G06T 7/001
See application file for complete search history.

(56) References Cited

U.S. PATENT DOCUMENTS

2021/0012167 A1    1/2021    Takahashi

FOREIGN PATENT DOCUMENTS

| JP | H10-055439 A | | 2/1998 |
|---|---|---|---|
| JP | H1055439 A | * | 2/1998 |
| JP | 2007-041643 A | | 2/2007 |
| JP | 2008015848 A | * | 1/2008 |
| JP | 2017010322 A | * | 1/2017 |
| JP | 2020-047151 A | | 3/2020 |
| WO | 2019/123917 A1 | | 6/2019 |

(Continued)

OTHER PUBLICATIONS

Extended European Search Report for EP Application No. 20926838.2, dated on Oct. 27, 2022.

(Continued)

*Primary Examiner* — Matthew C Bella
*Assistant Examiner* — Janice E. Vaz

(57) ABSTRACT

An individual identification system includes an acquiring means and a determining means. The acquiring means is configured to acquire a matched image obtained by shooting part of a predetermined region of a matching target object. The determining means is configured to calculate a score representing a degree to which a partial image similar to the matched image exists in a registration image obtained by shooting a predetermined region of a registration target object, and determine based on the score whether or not the matching target object is identical to the registration target object.

5 Claims, 35 Drawing Sheets

(56) References Cited

FOREIGN PATENT DOCUMENTS

WO  2020/039567 A1  2/2020
WO  2020/044933 A1  3/2020

OTHER PUBLICATIONS

Zhang X et al: "Face recognition across pose: A review", Pattern Recognition, Elsevier, GB, vol. 42, No. 11, Nov. 30, 2009 (Nov. 30, 2009), pp. 2876-2896, XP026250877, ISSN: 0031-3203, DOI: 10.1016/J.PATCOG.2009.04.017 [retrieved on May 6, 2009].
International Search Report for PCT Application No. PCT/JP2020/013992, mailed on Jun. 23, 2020.

* cited by examiner

FIG. 7

| COMPONENT NUMBER | REGISTRATION FEATURE VALUE | REGISTRATION IMAGE SIZE |
|---|---|---|
| 001 | RF_file001 | LENGTH:600  WIDTH:1800 |
| 002 | RF_file002 | LENGTH:600  WIDTH:1800 |
| ⋮ | ⋮ | ⋮ |

$$F(k_1,k_2) = \sum_{n_1,n_2} f(n_1,n_2) W_{N_1}^{k_1 n_1} W_{N_2}^{k_2 n_2}$$

$$= A_F(k_1,k_2) e^{j\theta_F(k_1,k_2)} \quad \cdots (1)$$

$$G(k_1,k_2) = \sum_{n_1,n_2} g(n_1,n_2) W_{N_1}^{k_1 n_1} W_{N_2}^{k_2 n_2}$$

$$= A_G(k_1,k_2) e^{j\theta_G(k_1,k_2)} \quad \cdots (2)$$

$$W_{N_1} = e^{-j\frac{2\pi}{N_1}} \quad \cdots (3)$$

$$W_{N_2} = e^{-j\frac{2\pi}{N_2}} \quad \cdots (4)$$

$$\sum_{n_1,n_2} = \sum_{n_1=-M_1}^{M_1} \sum_{n_2=-M_2}^{M_2} \quad \cdots (5)$$

FIG. 15

$$R(k_1,k_2) = \frac{F(k_1,k_2)\overline{G(k_1,k_2)}}{|F(k_1,k_2)\overline{G(k_1,k_2)}|}$$

$$= e^{j(\theta_F(k_1,k_2) - \theta_G(k_1,k_2))}$$

$$\cdots (6)$$

FIG. 16

$$F(k_1, k_2) = A_F(k_1, k_2) e^{j\theta_F(k_1, k_2)} \quad \cdots (7)$$

$$G(k_1, k_2) = A_G(k_1, k_2) e^{j\theta_G(k_1, k_2)}$$
$$\cong F(k_1, k_2) \cdot e^{-j\frac{2\pi}{N_1}k_1\delta_1} e^{-j\frac{2\pi}{N_2}k_2\delta_2} \quad \cdots (8)$$

$$R(k_1, k_2) = \frac{F(k_1, k_2)\overline{G(k_1, k_2)}}{|F(k_1, k_2)\overline{G(k_1, k_2)}|}$$
$$\cong e^{j\frac{2\pi}{N_1}k_1\delta_1} e^{j\frac{2\pi}{N_2}k_2\delta_2} \quad \cdots (9)$$

FIG. 20

$$H_{2m} = \begin{bmatrix} H_m & H_m \\ H_m & -H_m \end{bmatrix}, \quad m=2,4,\cdots,\frac{N}{2} \quad \cdots(10)$$

$$H_2 = \begin{bmatrix} 1 & 1 \\ 1 & -1 \end{bmatrix} \quad \cdots(11)$$

FIG. 21

$$Y = H_N X H_N \quad \cdots (12)$$

INDIVIDUAL IDENTIFICATION SYSTEM

This application is a National Stage Entry of PCT/JP2020/013992 filed on Mar. 27, 2020, the contents of all of which are incorporated herein by reference, in their entirety.

TECHNICAL FIELD

The present invention relates to an individual identification system, an individual identification method, and a recording medium.

BACKGROUND ART

The assignment of product numbers to products and the like has been used for management of quality and distribution of the products so far. A method of attaching barcodes, IC tags or RFIDs to products and identifying the lot or individual of the products has also been used. However, for example, in the case of an object such as a minute product, it has been difficult in terms of the cost and technique to print letters on individual objects or attach IC tags to individual objects, and it has been difficult to perform lot/individual management using the above method.

On the other hand, in recent years, a method of identifying a random pattern on the surface of an object such as a product or on the surface of a material applied to the surface of the object with an image and performing individual identification and authenticity determination of the object has been proposed. An example of the technique relating to such individual identification and authenticity determination with a random pattern is described in Patent Document 1.

According to the technique described in Patent Document 1, a random pattern image acquired from each of a plurality of subregions (regions previously determined as matched regions) of the surface of a registration target object is stored in advance in a storage device in association with the identification ID of the registration target object. Then, at the time of determining whether or not a matching target object is identical to the registration target object, it is determined whether or not the matching target object is identical to the registration target object by acquiring a random pattern from each of a plurality of subregions on the matching target object that are the same as the subregions at registration, comparing the random pattern image acquired from the matching target object with the random pattern images of the registration target objects stored in the storage device, and comprehensively evaluating the result of comparison of all the subregions.

Patent Document 1: Japanese Unexamined Patent Application Publication No. JP-A 2007-041643
Patent Document 2: WO-A1-2019/123917

However, in the case of using the method for determining whether or not a matching target object is identical to a registration target object by comprehensively evaluating the result of comparison of random pattern images in all subregions (referred to as an individual identification method relating to the present invention hereinafter), there is a need to acquire the random pattern images from all of the subregions on the matching target object that are the same as those at registration, which decreases the convenience of individual identification.

SUMMARY

An object of the present invention is to provide an individual identification system that solves the abovementioned problem.

An individual identification system as an aspect of the present invention includes: an acquiring means configured to acquire a matched image obtained by shooting part of a predetermined region of a matching target object; and a determining means configured to calculate a score representing a degree to which a partial image similar to the matched image exists in a registration image obtained by shooting a predetermined region of a registration target object, and determine based on the score whether or not the matching target object is identical to the registration target object.

An individual identification method as another aspect of the present invention includes: acquiring a matched image obtained by shooting part of a predetermined region of a matching target object; calculating a score representing a degree to which a partial image similar to the matched image exists in a registration image obtained by shooting a predetermined region of a registration target object; and determining based on the score whether or not the matching target object is identical to the registration target object.

A computer-readable recording medium as another aspect of the present invention is a non-transitory computer-readable recording medium having a program recorded thereon. The program includes instructions for causing a computer to perform: a process of acquiring a matched image obtained by shooting part of a predetermined region of a matching target object; a process of calculating a score representing a degree to which a partial image similar to the matched image exists in a registration image obtained by shooting a predetermined region of a registration target object; and a process of determining based on the score whether or not the matching target object is identical to the registration target object.

With the configurations as described above, the present invention can increase the convenience of an individual identification system that determines whether or not a matching target object is identical to a registration target object.

BRIEF DESCRIPTION OF DRAWINGS

FIG. 7 is a view showing an example of the format of a registration DB in the individual identification apparatus according to the first example embodiment of the present invention;

FIG. 12 is a view showing an example of mathematical equations showing the frequency feature of a matched image and the frequency feature of a registration image;

FIG. 15 is a view showing an example of a mathematical equation for calculating a normalized cross power spectrum;

FIG. 16 is a view showing an example of mathematical equations showing a frequency feature $F(k_1,k_2)$, a frequency feature $G(k_1,k_2)$, and a normalized cross power spectrum $R(k_1,k_2)$ of a pair of identical images with displacement;

FIG. 20 is an explanation view of a Hadamard matrix;

FIG. 21 is a view showing an equation showing orthogonal transformation using a Hadamard matrix;

EXAMPLE EMBODIMENTS

First Example Embodiment

Figure 1:
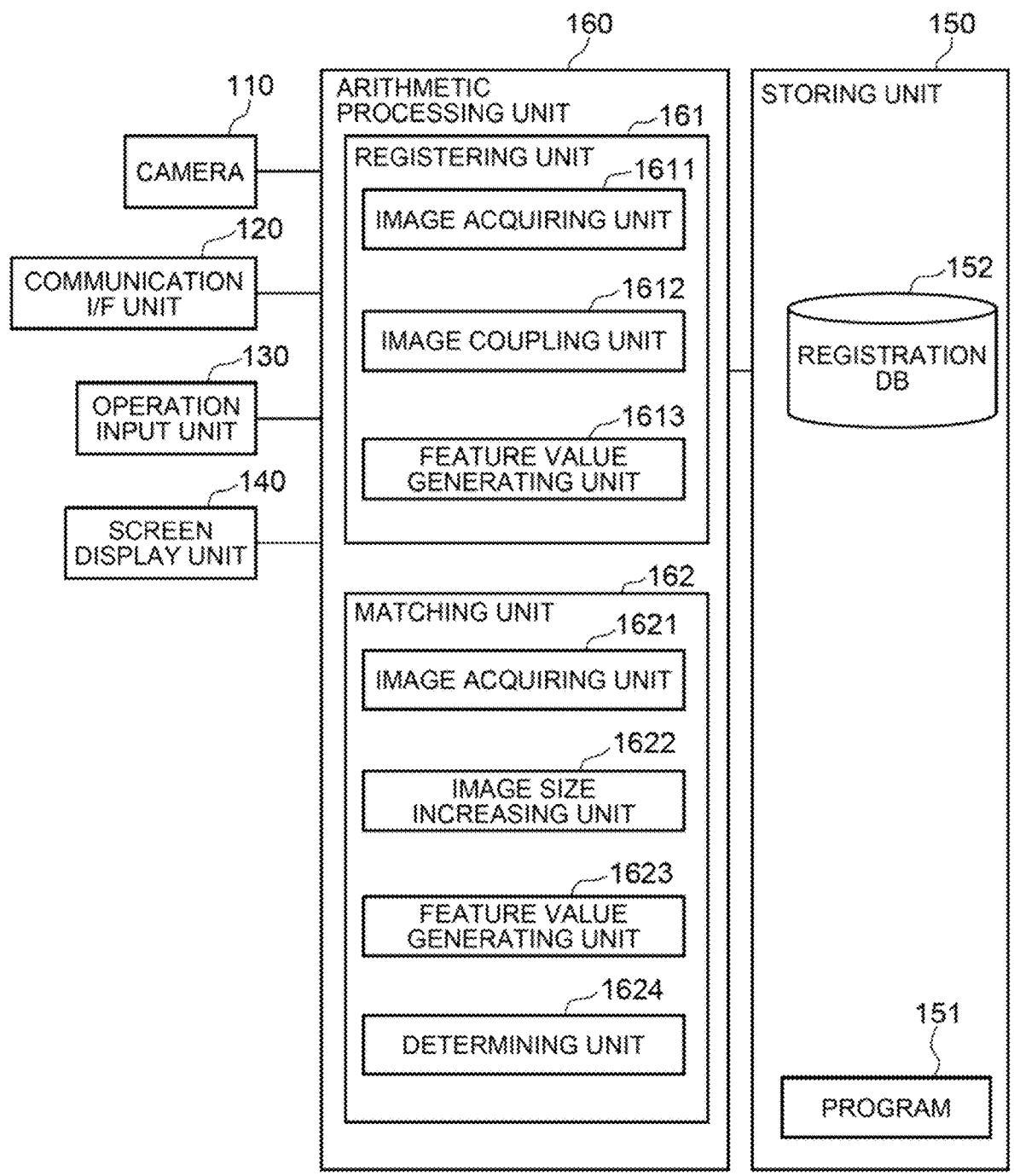
FIG. 1 is a block diagram of an individual identification apparatus according to a first example embodiment of the present invention.

FIG. 1 is a block diagram of an individual identification apparatus 100 according to a first example embodiment of the present invention. The individual identification apparatus 100 shown in FIG. 1 is an information processing apparatus that manages the individuals of mass-produced components for the purpose of manufacturing process control, quality control, shipping control, sales control, or the like.

Referring to FIG. 1, the individual identification apparatus 100 includes a camera 110, a communication I/F unit 120, an operation input unit 130, a screen display unit 140, a storing unit 150, and an arithmetic processing unit 160.

The camera 110 is a shooting device that shoots an image of a component to be the target of individual identification. The camera 110 may be, for example, a visible light and color area camera equipped with a CCD (Charge-Coupled Device) image sensor or a CMOS (Complementary MOS) image sensor having a pixel capacity of about several million pixels. The camera 110 may also be, for example, a visible light and color line camera equipped with a line sensor having a pixel capacity of ten-thousand pixels per line.

The communication I/F unit 120 is composed of a data communication circuit and is configured to perform data communication with an external device by wireless or wired communication. The operation input unit 130 is composed of a device such as a keyboard and a mouse, and is configured to detect an operation by an operator and output to the arithmetic processing unit 160. The screen display unit 140 is composed of a device such as an LCD (Liquid Crystal Display) and is configured to display various information on a screen in accordance with an instruction from the arithmetic processing unit 160.

The storing unit 150 is composed of a storage device such as a hard disk and a memory, and is configured to store processing information and a program 151 that are necessary for various processing in the arithmetic processing unit 160. The program 151 is a program loaded to and executed by the arithmetic processing unit 160 to realize various processing units, and is previously loaded from an external device or a recording medium, which are not shown, via a data input/output function such as the communication I/F unit 120 and stored into the storing unit 150. Major processing information stored in the storing unit 150 is a registration DB (database) 120.

The registration DB 152 is a database that stores a feature value unique to component individual generated from an image of a registration target component shot by the camera 110 in association with an individual number.

The arithmetic processing unit 160 has a processor such as an MPU and a peripheral circuit thereof, and is configured to load the program 151 from the storing unit 150 and execute the program 151 to make the abovementioned hardware and the program 151 cooperate and realize various processing units. Major processing units realized by the arithmetic processing unit 160 are a registering unit 161 and a matching unit 162.

The registering unit 161 is configured to generate a feature value unique to component individual from an image obtained by shooting a registration target component, and register the generated feature value into the registration DB 152 in association with the individual number of the component. The registering unit 161 includes an image acquiring unit 1611, an image coupling unit 1612, and a feature value generating unit 1613.

The image acquiring unit 1611 is configured to acquire, for each registration target component, a plurality of images obtained by shooting a predetermined region of the component multiple times as necessary from the camera 110.

The image coupling unit 1612 is configured to generate, for each registration target component, a registration image obtained by arranging the plurality of images acquired by the image acquiring unit 1611 into one image.

The feature value generating unit 1613 is configured to extract, for each registration target object, a feature value depending on a random pattern existing in image from the registration image generated by the image coupling unit 1612, as a registration feature value. The feature value generating unit 1613 is also configured to, for each registration target component, register the registration feature value into the registration DB 152 in association with the individual number of the component.

The matching unit 162 is configured to calculate a score representing a degree that a partial image similar to an image obtained by shooting at least part of a predetermined region of a matching target component exists in an image obtained by shooting a predetermined image of a registration target component. A method for obtaining a similarity degree between images includes a method of directly comparing images with each other and a method of comparing feature values extracted from the respective images with each other. In this example, the matching unit 162 uses the latter method. The matching unit 162 is also configured to determine whether or not the matching target component is identical to the registration target component based on the score. The matching unit 162 includes an image acquiring unit 1621, an image size increasing unit 1622, a feature value generating unit 1623, and a determining unit 1624.

The image acquiring unit 1621 is configured to acquire an image obtained by shooting at least part of a predetermined region of a matching target component from the camera 110. It is desired herein that at least part of the predetermined region is a region having an area (for example, 0.1 mm$^2$ or more, preferably several mm$^2$ or more) equal to or more than a minimum area to obtain a random pattern necessary for securing an identification ability of a degree to which different components can be identified for as many component individuals as possible.

The image size increasing unit 1622 is configured to, in a case where the size of an image acquired by the image acquiring unit 1621 is smaller than the size of a registration image, increase to the same size as that of the registration image to generate a matched image. For example, the image size increasing unit 1622 is configured to generate, as a matched image, a composite image in which an image acquired by the image acquiring unit 1621 is pasted onto one background image whose size is the same as that of the registration image and whose all pixels have a predetermined value such as a zero value. In other words, the image size increasing unit 1622 is configured to generate an image obtained by increasing the size of an image acquired by the image acquiring unit 1621 by connecting pixels having a predetermined value such as a zero value, to the same size as that of the registration image.

The feature value generating unit 1623 is configured to extract a feature value depending on a random pattern existing in image from a matched image generated by the image size increasing unit 1622, as a matched feature value.

The determining unit 1624 is configured to calculate a score representing a degree that a partial feature value similar to the matched feature value generated by the feature value generating unit 1623 exists in the registration feature values stored in the registration DB 152, and determine whether or not the matching target component is identical to any of the registration target components based on the score. The determining unit 1624 is also configured to display the result of determination on the screen display unit 140 or/and output to an external device through the communication I/F unit 120.

Figure 2:
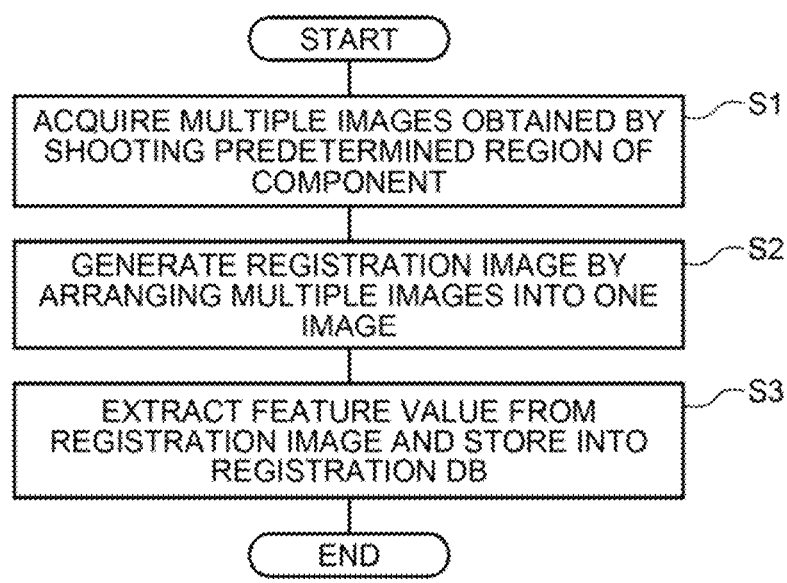
FIG. 2 is a flowchart showing an example of a registration operation of the individual identification apparatus according to the first example embodiment of the present invention.
Figure 3:
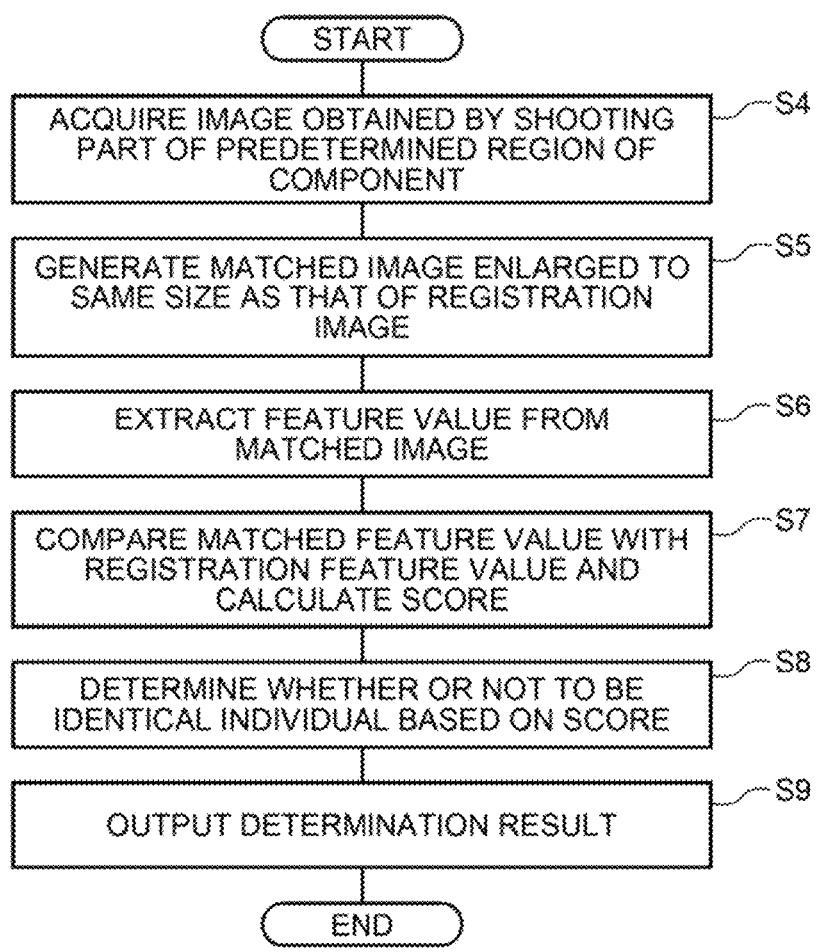
FIG. 3 is a flowchart showing an example of a matching operation of the individual identification apparatus according to the first example embodiment of the present invention.

Subsequently, an operation of the individual identification apparatus 100 will be described. The operation of the individual identification apparatus 100 is generally divided into two; a registration operation and a matching operation. FIG. 2 is a flowchart showing an example of the registration operation of the individual identification apparatus 100. FIG. 3 is a flowchart showing an example of the matching operation of the individual identification apparatus 100.

First, the registration operation of the individual identification apparatus 100 will be described. In the registration operation, as shown in FIG. 2, the image acquiring unit 1611 acquires, for each registration target component, a plurality of images obtained by shooting a predetermined region of the component multiple times as necessary from the camera 110 (step S1). Next, the image coupling unit 1612 generates, for each registration target component, a registration image obtained by arranging the plurality of images acquired by the image acquiring unit 1611 into one image (step S2). Next, the feature value generating unit 1613 extracts, for each registration target component, a feature value depending on a random pattern existing in image from the registration image generated by the image coupling unit 1612 as a registration feature value, and stores the registration feature value into the registration DB 152 in association with the individual number of the component (step S3). This completes the registration operation.

Next, the matching operation will be described. In the matching operation, as shown in FIG. 3, first, the image acquiring unit 1621 acquires an image obtained by shooting at least part of a predetermined region of a matching target component from the camera 110 (step S4). Next, in a case where the size of the image acquired by the image acquiring unit 1621 is smaller than the size of the registration image, the image size increasing unit 1622 generates a matched image by increasing the size of the image to the same size as that of the registration image (step S5). In a case where the size of the image acquired by the image acquiring unit 1621 is the same as the size of the registration image, the image size increasing unit 1622 generates the acquired image as a matched image. Next, the feature value generating unit 1623 extracts a feature value depending on a random pattern existing in image from the matched image as a matched feature value (step S6).

Next, the determining unit 1624 searches the registration DB 152 for not only a registration feature value entirely similar to the matched feature value but also a registration feature value partly similar to the matched feature value, and thereby determines whether or not the matching target component is identical to any of the registration target components. Specifically, for each registration feature value of the registration target component stored in the registration DB 152, the determining unit 1624 compares the matched feature value with the registration feature value and calculates a score representing a degree of similarity (step S7). Next, the determining unit 1624 determines whether or not the matching target component is identical to any of the registration target components based on the calculated score (step S8). Next, the determining unit 1624 displays the result of determination on the screen display unit 140 or/and outputs to an external device through the communication I/F unit 120 (step S9).

Subsequently, the registering unit 161 and the matching unit 162 will be described in more detail.

First, the registering unit 161 will be described in detail.

Figure 4:
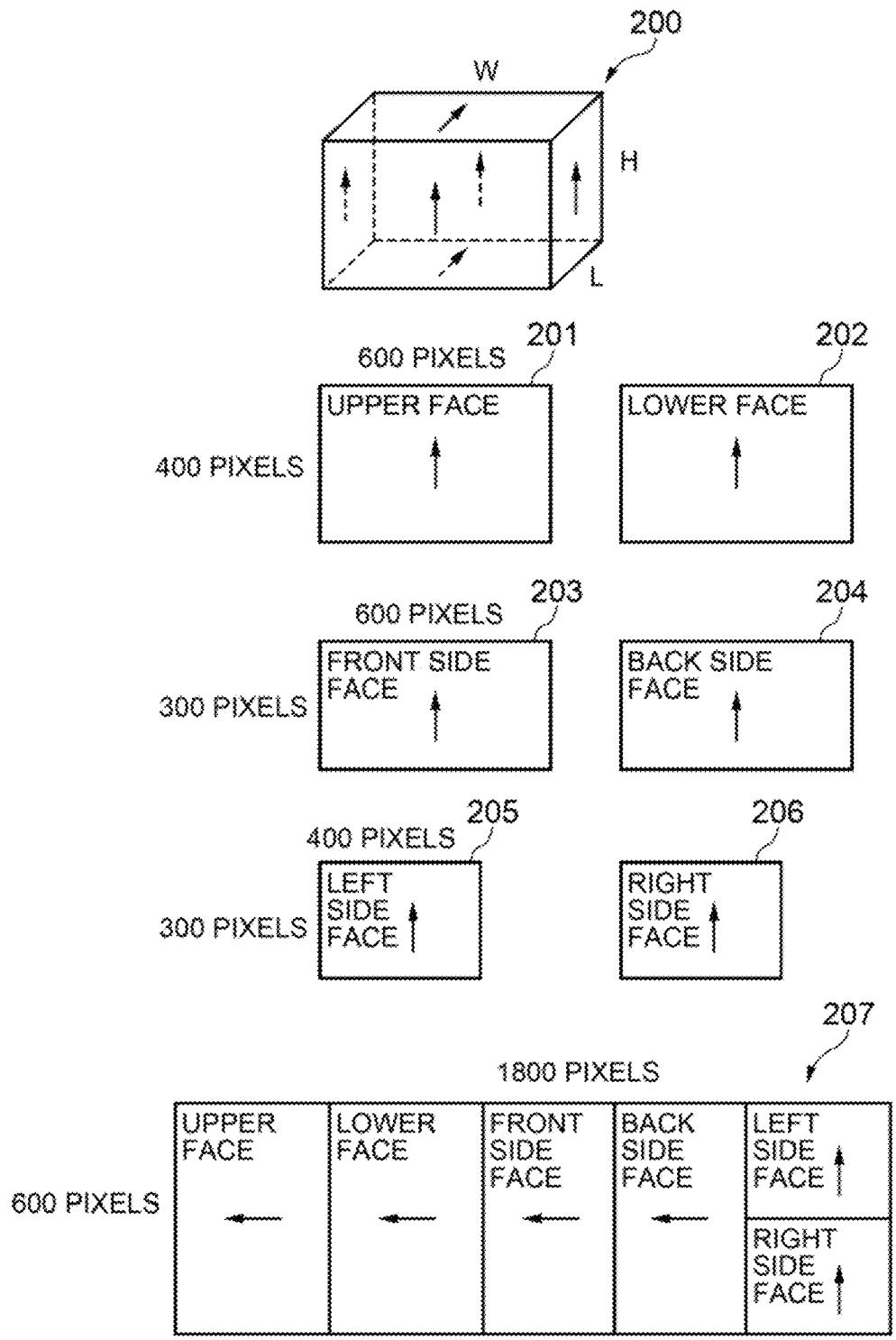
FIG. 4 is a view showing an example of the appearance, predetermined region, and registration image of a component having a rectangular parallelepiped shape to be registered in the first example embodiment of the present invention.

FIG. 4 shows an example of a component to be registered by the registering unit 161. The component in this example is a component 200 having a rectangular parallelepiped shape made of a material such as metal or synthetic resin. A length size L, a width size W, and a height size H of the component 200 may be any sizes. For example, the component 200 may have a length size L of 8 mm, a width size W of 12 mm, and a height size H of 6 mm. The surface of the component 200 is composed of a total of six surfaces including an upper face, a lower face, a front side face, a back side face, a right side face and a left side face when observed from the paper surface. In FIG. 4, each face of the component and an image of each surface are marked with a thin arrow. This arrow is a symbol for the sake of convenience for determining the orientation of each face and each image of the component 200, and does not actually exist in any face or any face image of the component 200. The same applies to a thin arrow shown in another drawing. In this example, a registration feature value depending on a random pattern unique to component individual is extracted from all the regions of the six faces. That is to say, a predetermined region of the component 200 is all the six faces.

The image acquiring unit 1611 of the registering unit 161 shoots each of the faces of the component 200 from the front thereof with the camera 110 in accordance with an operation by an operator performing a registration work or by an autonomous operation of the registration unit 161, and thereby acquires a total of six images including an upper face shot image 201, a lower face shot image 202, a front side face shot image, a back side face shot image 204, a right side face shot image 205 and a left side face shot image 206 as shown in FIG. 4. For example, the image acquiring unit 1611 cuts out only an upper face image region by edge detection or the like from an image obtained by shooting the entire upper face at a predetermined pixel resolution and thereby acquires the upper face shot image 201. The image acquiring unit 1611 can acquire the images other than the upper face shot image 201 by the same method. The images of the respective faces may be shot by using a plurality of cameras 110. Although the six shot images may have any size, it is assumed as an example that the six shot images have image sizes as shown in FIG. 4. That is to say, for example, the upper face shot image 201 has a length size of 400 pixels and a width size of 600 pixels.

Next, the image coupling unit 1612 arranges the six shot images to generate a registration image. In the case of shot images of a plurality of faces such as the six faces of a rectangular parallelepiped in which a matched image is not generated across the boundaries of the adjacent faces, the order, spacing and so on of arrangement may be freely selected. However, it is necessary that the orientations of the images are the same as an orientation determined for each same shot image of the same kind of component. It is also necessary that a plurality of shot images do not overlap each other. For example, the image coupling unit 1612 may arrange a plurality of shot images without spacing in the same orientation in one row or a plurality of rows, or may arrange shot images of broad width in the same orientation in one row and arrange shot images of narrow width in the same orientation in two rows. In the example of the registration image 207 shown in FIG. 4, the registration image 207 having a length size of 600 pixels and a width size of 1800 pixels is generated by arranging the upper face shot image 201, the lower face shot image 202, the front side face shot image 203 and the back side face shot image 204 so as to be in contact with each other in one row so that the arrows point leftward on the sheet of paper, and arranging at one end of the one row the right side face shot image 205 and the left side face shot image 206 in two rows so that the arrows point upward on the sheet of paper.

Next, the feature value generating unit 1613 extracts a feature value depending on a random pattern existing in image from the registration image 207 as a registration feature value, and stores into the registration DB 152. For example, the feature value generating unit 1613 may extract a registration feature value using the following method.

The feature value generating unit 1613 first performs frequency transformation (for example, discrete Fourier transform) on the registration image 207 to obtain amplitude information and phase information (two-dimensional array data, respectively) that are the result of transformation into a frequency domain. That is to say, the feature value generating unit 1613 obtains amplitude information and phase information as two-dimensional array data by performing one-dimensional Fourier transform on the registration image 207 in the lateral direction of the paper surface, and then performing one-dimensional Fourier transform in the longitudinal direction of the paper surface.

Next, the feature value generating unit 1613 extracts only a frequency band useful for individual identification from at least one of the amplitude information and the phase information, and uses the result of extraction as a registration feature value. By thus using only a frequency band useful for individual identification as a registration feature value, it is possible to reduce the data amount of the registration feature value. Meanwhile, the feature value generating unit 1613 may use either the amplitude information or the phase information before extracting a frequency band useful for individual identification, as a registration feature value.

Figure 5:
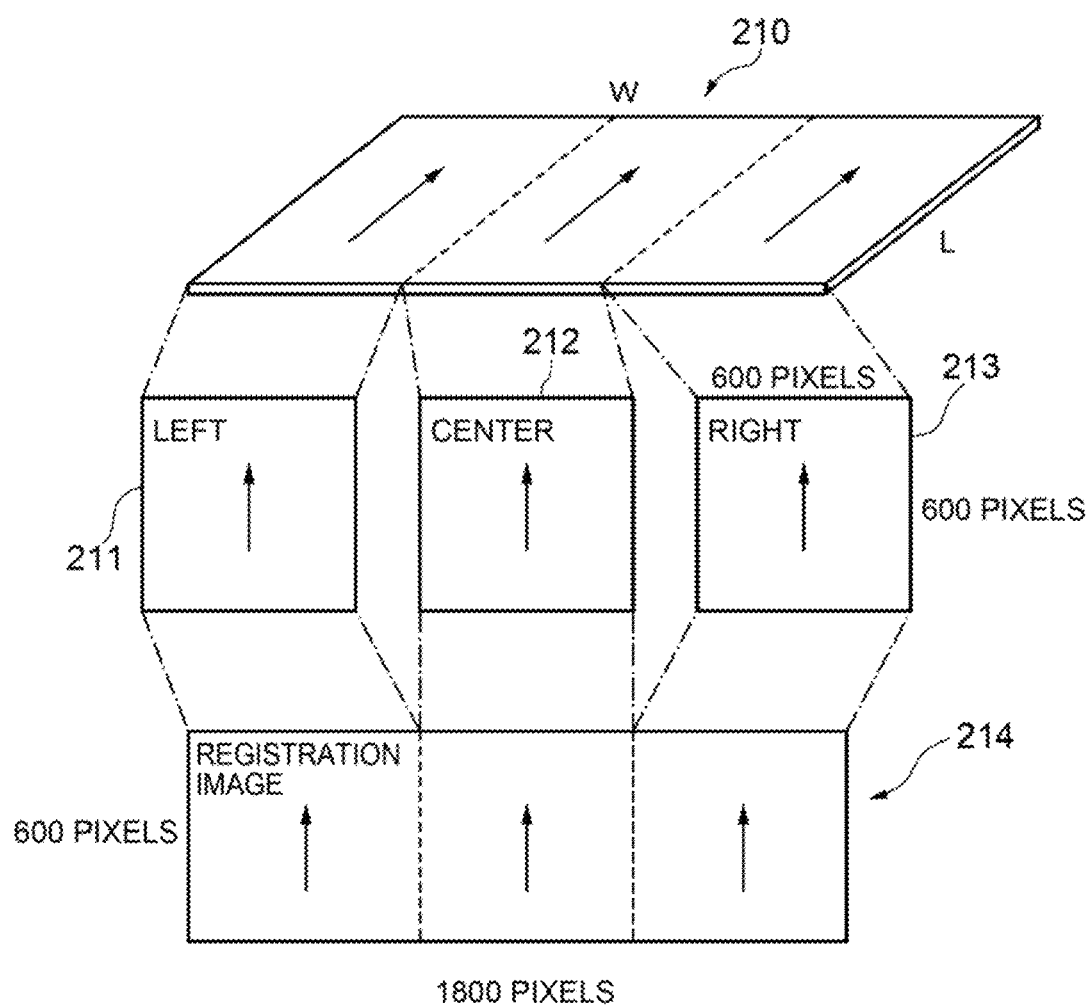
FIG. 5 is a view showing an example of the appearance, predetermined region, and registration image of a component having a flat plate shape to be registered in the first example embodiment of the present invention.

FIG. 5 shows another example of a component to be registered by the registering unit 161. The component in this example is a component 210 having a flat plate shape made of a material such as metal or resin. A length size L and a width size W of the component 210 may be any sizes. For example, the component 210 may have a length size L of 12 mm and a width size W of 36 mm. In this example, a registration feature value depending on a random pattern unique to component individual is extracted from all the regions of the surface of the component 210. A registration feature value is not extracted from the rear face or the side faces of the component 210. That is to say, a predetermined region of the component 210 is all the regions of the surface.

The image acquiring unit 1611 of the registering unit 161 acquires one shot image by shooting the entire surface of the component 210 with the camera 110 in accordance with an operation by an operator performing a registration work or by an autonomous operation of the registration unit 161. For example, in a case where the camera 110 is an area camera and a surface image having a predetermined image resolution can be obtained even when the shooting is performed with the entire surface of the component 210 included in the field of view of the camera, the image acquiring unit 1611 shoots the entire surface of the component 210 by shooting one time to acquire one shot image. In a case where a surface image having a predetermined image resolution cannot be obtained when the shooting is performed with the entire surface of the component 210 included in the field of view of the camera, the image acquiring unit 1611 acquires one shot image covering the entire surface of the component 210 by dividing the entire surface of the component 210 into several regions, shooting the individual division regions with the camera 110, and connecting the shot images of the division regions.

FIG. 5 shows an example of acquiring a total of three shot images including a left side shot image 211, a center shot image 212 and a right side shot image 213 and connecting the three shot images to acquire one shot image covering the entire surface of the component 210. Although the three shot images may have any image sizes, it is assumed herein as an example that the three shot images have image sizes as shown in FIG. 5. That is to say, the left side, center, and right side shot images 211 to 213 each have a length size of 600 pixels and a width size of 600 pixels. In a case where the camera 110 is a line camera, the image acquiring unit 1611 may acquire the entire surface of the component 210 as one shot image.

Next, the image coupling unit 1612 generates a registration image 214 from the one image obtained by shooting the entire surface of the component 210 acquired by the image acquiring unit 1611. In the example shown in FIG. 5, the image coupling unit 1612 uses the one image obtained by shooting the entire surface of the component 210 acquired by the image acquiring unit 1611 as the registration image 214. As a result, the registration image 214 having a length size of 600 pixels and a width size of 1800 pixels is generated.

Next, the feature value generating unit 1613 extracts, by the same method as described above, a feature value depending on a random pattern existing in image from the registration image 214 as a registration feature value, and stores into the registration DB 152.

Figure 6:
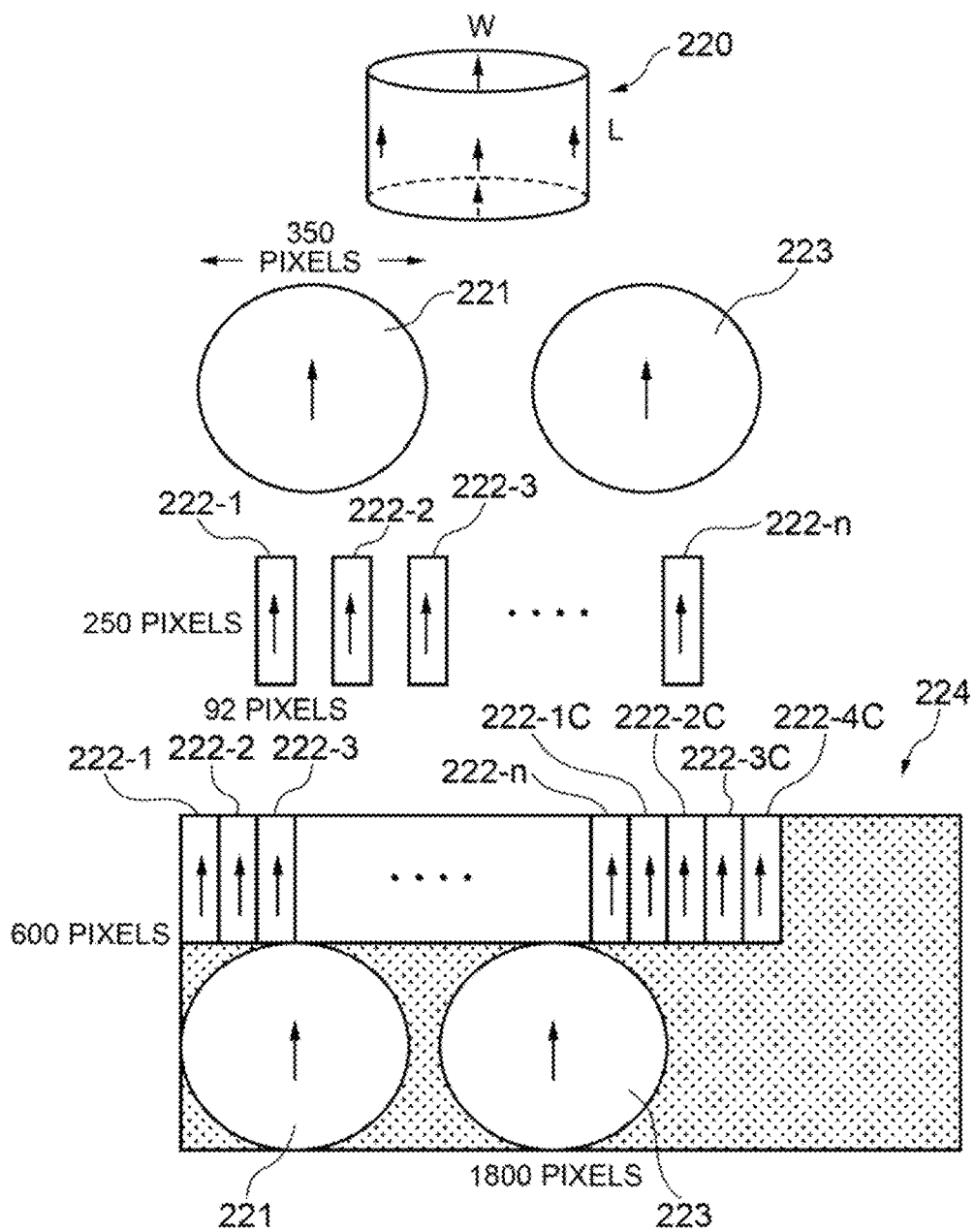
FIG. 6 is a view showing an example of the appearance, predetermined region, and registration image of a component having a cylindrical shape to be registered in the first example embodiment of the present invention.

FIG. 6 shows still another example of a component to be registered by the registering unit 161. The component in this example is a component 220 having a cylindrical shape made of a material such as metal. A height size L and a maximum width size W of the component 220 may be any sizes. For example, the component 220 may have a size L of 5 mm and a size W of 7 mm. The surface of the component 220 is composed of a total of three faces including an upper face, a lower face, and a side face. In this example, a registration feature value depending on a random pattern unique to component individual is extracted from all the regions of the three faces. That is to say, a predetermined region of the component 220 is the entire surface.

In a case where the camera 110 is an area camera, the image acquiring unit 1611 of the registering unit 161 acquires a plurality of shot images by shooting the entire surface of the component 220 with the camera 110 multiple times so that a predetermined image resolution can be obtained in accordance with an operation by an operator performing a registration work or by an autonomous operation of the registration unit 161. In the example shown in FIG. 6, the image acquiring unit 1611 acquires a total of n+2 shot images including an upper face shot image 221, a plurality of side face shot images 222-$l$ to 222-$n$, and a lower face shot image 223. For example, the image acquiring unit 1611 acquires the upper face shot image 221 by cutting out only an upper face image region from an image obtained by shooting the upper face of the component 220 from the front thereof with the camera 110. The image acquiring unit 1611 also acquires the lower face shot image 223 in the same manner as the upper surface shot image 221. Moreover, the image acquiring unit 1611 divides the side face of the component 210 into n subregions along the whole circumference and, for each of the subregions, cuts out only an image region of the subregion from an image shot from the front thereof with the camera 110, and thereby acquires the n shot images 222-1 to 222-$n$ obtained by shooting different subregions of the side face. The division number n can be freely selected. As the number n is larger, it is possible to obtain an image of a subregion with less distortion. Although the n+2 shot images may have any image sizes, it is assumed herein as an example that the n+2 shot images have sizes as shown in FIG. 6. That is to say, the upper face and lower face shot images 221 and 223 have the maximum width of 350 pixels, and the n shot images 222-1 to 222-$n$ each have a length size of 250 pixels and a width size of 92 pixels.

Next, the image acquiring unit 1611 connects the n shot images 222-1 to 222-$n$ obtained by shooting the side face of the component 210 to acquire one side face shot image that covers the entire side face of the component 220 one round or more.

In a case where the camera 110 is a line camera, the image acquiring unit 1611 may acquire one shot image that covers the entire side face of the component 220 one round or more from the line camera.

Next, the image coupling unit 1612 generates a registration image by arranging a total of three shot images including the upper face shot image 221, the lower face shot image 223, and the side face shot image that covers the entire side face one round or more acquired by the image acquiring unit 1611. In this example, the image coupling unit 1612 generates a registration image of a specified size by pasting the above three shot images onto a prepared background image of specified size so as not to overlap each other. The background image is an image in which the values of all the pixels are a predetermined value. As the predetermined value, for example, a zero value may be used. Alternatively, a constant value other than the zero value may be used as long as it does not affect the random pattern.

In the case of the shot images of a plurality of faces in which a matched image is not generated across the boundaries of the adjacent faces, such as the upper face, lower face and side face of a cylinder, the order, spacing and so on of arrangement on a background image are freely selected. However, it is necessary that the orientations of the images are the same as an orientation determined for each same shot image of the same kind of component. It is also necessary that the plurality of shot images do not overlap each other. In the example of the registration image 224 shown in FIG. 6, the shot image of the side face that covers the entire side face one round or more obtained by connecting the n shot images 222-1 to 222-n is pasted in the upper region of the background image so that the arrows point upward on the sheet of paper, and the upper face and lower face shot images 221 and 223 are pasted in the lower region so that the arrows point upward on the sheet of paper. In FIG. 6, a dotted region on the registration image 224 represents a region of pixels having a zero value where no shot image is pasted.

In the case of a continuous image generated by developing the entire circumference of an object into one image, such as the side face of a cylinder, both the ends of the developed image are continuous on the original object, but are separated on the developed image. That is to say, in the example of FIG. 6, the right edge of the shot image 222-n and the left edge of the shot image 222-1 are continuous on the original component 220, but are separated on the developed image. Therefore, it becomes difficult to find a partial image that matches a matched image across the shot image 222-n and the shot image 222-1 from the registration image. Therefore, in the example of FIG. 6, by connecting copy images 222-1C to 222-4C of the shot images 222-1 to 222-4 so that the left edge of the shot image 222-1 comes in contact with the right edge of the shot image 222-n, one end of the continuous image is enlarged by 368 pixels, which is the image size of four shot images 222-i. The enlarged size may be 368 pixels or less, or may be more.

Next, by the same method as described above, the feature value generating unit 1613 extracts a feature value depending on a random pattern existing in image from the registration image 224 as a registration feature value and stores into the registration DB 152.

FIG. 7 shows an example of the format of the registration DB 152. In this example, the registration DB 152 includes a plurality of entries having one-to-one correspondence with registration target components, and each of the entries includes items of component number, registration feature value, and registration image size. In the item of component number, a component number such as a serial number assigned to the registration target component is set. In the item of registration feature value, the name of a file in which a registration feature value is recorded is set. The substance of the file is stored in another region of the storing unit 150, a cloud storage (not shown), or the like. In the item of registration image size, the size of a registration image from which the registration feature value is extracted is set. In the example of FIG. 7, the component number, the registration feature value, and the registration image size are stored for each of the registration target components. However, in the case of a configuration that the registration image sizes of all the components are the same as a specified value determined in advance, it is not necessary to store the registration image size for each of the individual components, and it is enough to store only the specified value.

The format of the registration DB 152 is not limited to the above. For example, each entry of the registration DB 152 may include another item in addition to the items of component number, registration feature value, and registration image size described above. The other item may be, for example, the kind of a product, a lot number, the date of manufacturing, product inspection result data, or the like.

Subsequently, the matching unit 162 will be described in detail.

Figure 8:
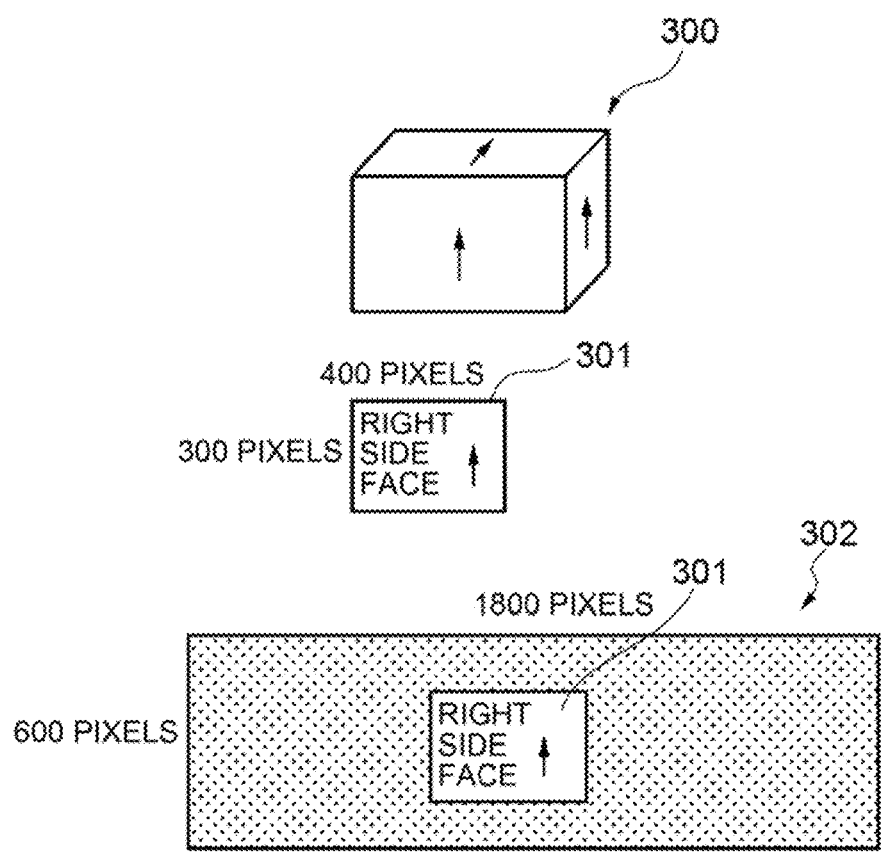
FIG. 8 is a view showing an example of the appearance, part of predetermined region, and matched image of a component having a rectangular parallelepiped shape to be matched in the first example embodiment of the present invention.

FIG. 8 shows an example of a component to be matched by the matching unit 162. A component 300 in this example is the same kind of component as the registration target component 200 shown in FIG. 4.

The image acquiring unit 1621 of the matching unit 162 shoots, for example, the right side face of the component 300 from the front thereof with the camera 110 in accordance with an operation by an operator performing a matching work or by an autonomous operation of the matching unit 162, and thereby acquires a shot image 301 obtained by shooting the right side face of the component 300 in a predetermined orientation as shown in FIG. 8. For example, the image acquiring unit 1621 cuts out only a right side face image region by edge detection or the like from the image obtained by shooting the entire right side face in a predetermined orientation and at a predetermined pixel resolution, and thereby acquires the shot image 301. Although the shot image 301 may have any image size, it is assumed herein as an example that the shot image 301 has a length size of 300 pixels and a width size of 400 pixels.

Next, the image size increasing unit 1622 determines whether or not the image size of the shot image 301 is smaller than the registration image size. It is assumed here that the registration image size is constant regardless of a difference of component individuals and the size is length=600 pixels and width=1800 pixels. In this case, the image size increasing unit 1622 generates, as a matched image, an image obtained by pasting the shot image 301 onto one background image whose image size is the above-mentioned registration image size and all pixels have a predetermined image such as a zero value. A place to paste the shot image 301 is freely selected. However, an orientation to paste the shot image 301 needs to be the same as that of the registration image. In the example of FIG. 8, a matched image 302 is generated in which the shot image 301 is pasted substantially at the center portion of the background image in an orientation that the arrow points upward on the sheet of paper.

Next, the feature value generating unit 1623 extracts a feature value depending on a random pattern existing in image from the matched image 302 as a matched feature value. A method by which the feature value generating unit 1623 extracts a matched feature value from the matched image 302 is the same as the method by which the feature value generating unit 1613 extracts a registration feature value from the registration image 207.

Next, the determining unit 1624 compares the matched feature value with each of the registration feature values stored in the registration DB 152, and thereby calculates a score representing the similarity between the matched feature value and the registration feature value. The details of a method by which the determining unit 1624 compares the two feature values and calculates the score representing the similarity will be described later.

Next, in a case where the maximum score of the above-mentioned scores calculated for the respective registration feature values stored in the registration DB 152 exceeds a preset determination threshold value, the determining unit 1624 determines that the registration target component specified by the component number stored in the registration DB 152 in association with the registration feature value of the maximum score is an identical individual to the component 300. In a case where the maximum score does not exceed the determination threshold value, the determining unit 1624 determines that an individual component identical to the component 300 is not registered in the registration DB 152.

In the above description, the image acquiring unit 1621 acquires the shot image 301 of the entire right side face of the component 300. Meanwhile, even in a case where the image acquiring unit 1621 acquires a shot image of part of the right side face of the component 300 or a shot image of the whole or part of a face other than the right side face, that is, any face of the upper face, lower face, front side face, back side face and left side face, the matching unit 162 performs the same operation as when the shot image 301 of the entire right side face is acquired, and it can thereby be determined whether or not the component 300 is an individual identical to any of the registration target components 200 stored in the registration DB 152. The reason is that, for each of the six faces of the registration target component 200, a registration feature value unique to component individual extracted from a shot image thereof is registered in advance in the registration DB 152.

Figure 9:
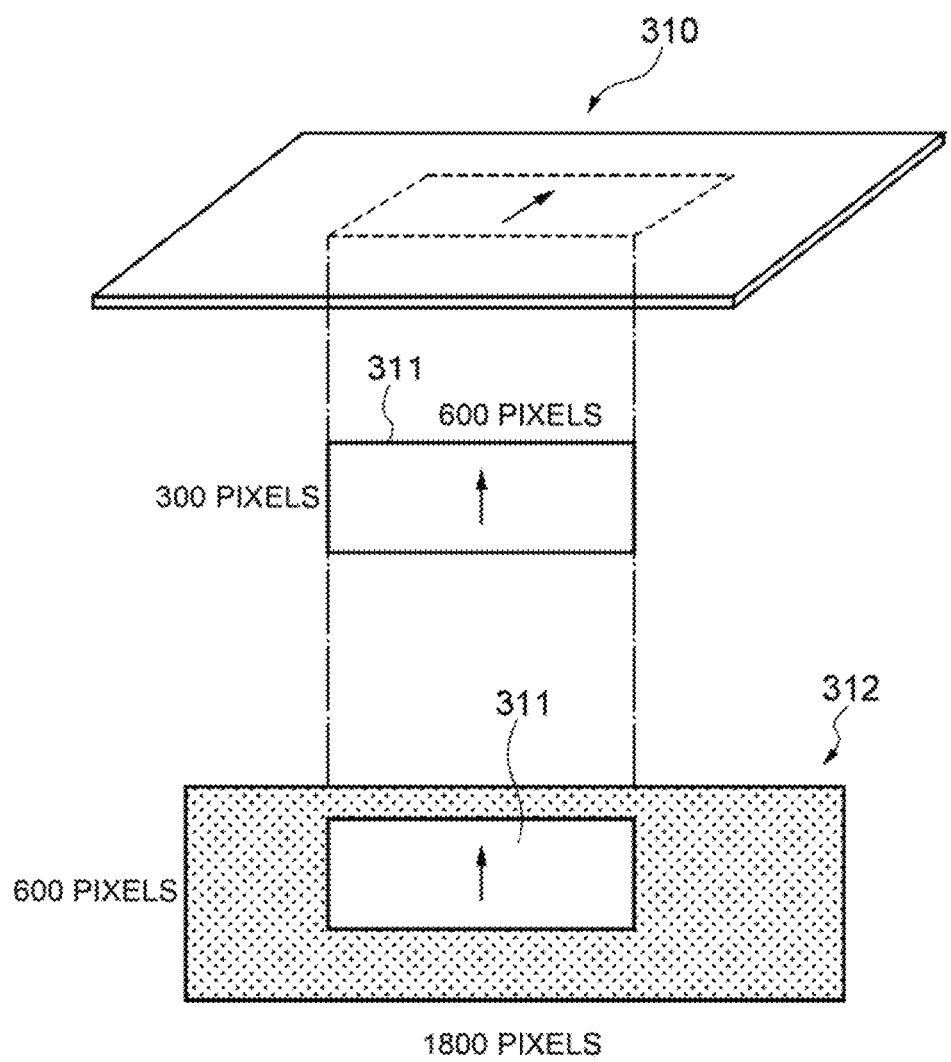
FIG. 9 is a view showing an example of the appearance, part of predetermined region, and matched image of a component having a flat plate shape to be matched in the first example embodiment of the present invention.

FIG. 9 shows another example of a component to be matched by the matching unit 162. A component 310 in this example is the same kind of component as the registration target component 210 shown in FIG. 5.

The image acquiring unit 1621 of the matching unit 162 shoots, for example, the center portion of the upper face of the component 310 from the front thereof with the camera 110 in accordance with an operation by an operator performing a matching work or by an autonomous operation of the matching unit 162, and thereby acquires a shot image 311 as shown in FIG. 9. Although the shot image 311 may have any image size, it is assumed here as an example that the shot image 311 has a length size of 300 pixels and a width size of 600 pixels.

Next, the image size increasing unit 1622 determines whether or not the image size of the shot image 311 is smaller than the registration image size. It is assumed here that the registration image size is constant regardless of a difference of component individuals and the size is length=600 pixels and width=1800 pixels. In this case, the image size increasing unit 1622 generates, as a matched image, an image obtained by pasting the shot image 311 onto one background image whose image size is the abovementioned registration image size and all pixels have a predetermined value such as a zero value. A place to paste the shot image 311 is freely selected. However, an orientation to paste the shot image 311 needs to be the same as in the registration image. In the example of FIG. 9, a matched image 312 is generated in which the shot image 311 is pasted at the center portion of the background image in an orientation that the arrow points upward on the sheet of paper.

Next, the feature value generating unit 1623 extracts a feature value depending on a random pattern existing in image from the matched image 312 as a matched feature value by the same method as the method of extracting a matched feature value from the matched image 302 of FIG. 8.

Next, the determining unit 1624 compares the matched feature value with each of the registration feature values stored in the registration DB 152 by the same method as the method described for the component 300 of FIG. 8, and thereby calculates a score representing the similarity between the matched feature value and the registration feature value. Then, the determining unit 1624 determines whether or not the component 310 is an individual identical to any of the components stored in the registration DB 152 based on the scores calculated for the respective registration feature values, and outputs the result.

In the above description, the image acquiring unit 1621 acquires part of the center portion of the upper face of the component 310 as the shot image 311. Meanwhile, even in a case where the image acquiring unit 1621 acquires a shot image of a region other than the center portion of the upper face of the component 310, for example, a region such as the left side or right side of the upper face of the component 310, the matching unit 162 performs the same operation as when the shot image 311 of the center portion of the upper face is acquired, and it can thereby be determined whether or not the component 310 is an individual identical to any of the registration target components 200 stored in the registration DB 152. The reason is that, for the registration target component 210, a registration feature value unique to component individual extracted from a shot image of the entire region of the upper face is registered in advance in the registration DB 152. On the other hand, in a case where the image acquiring unit 1621 acquires an image of the lower face or side face of the component 310, individual identification of the component 310 cannot be performed. The reason is that the feature values of the lower face and side face of the registration target component 210 are not registered in advance in the registration DB 152. Therefore, in a case where the lower face or side face of the registration target component 210 is shot at the time of matching thereof, the feature value of the lower face or side face may be registered in the registration DB 152.

Figure 10:
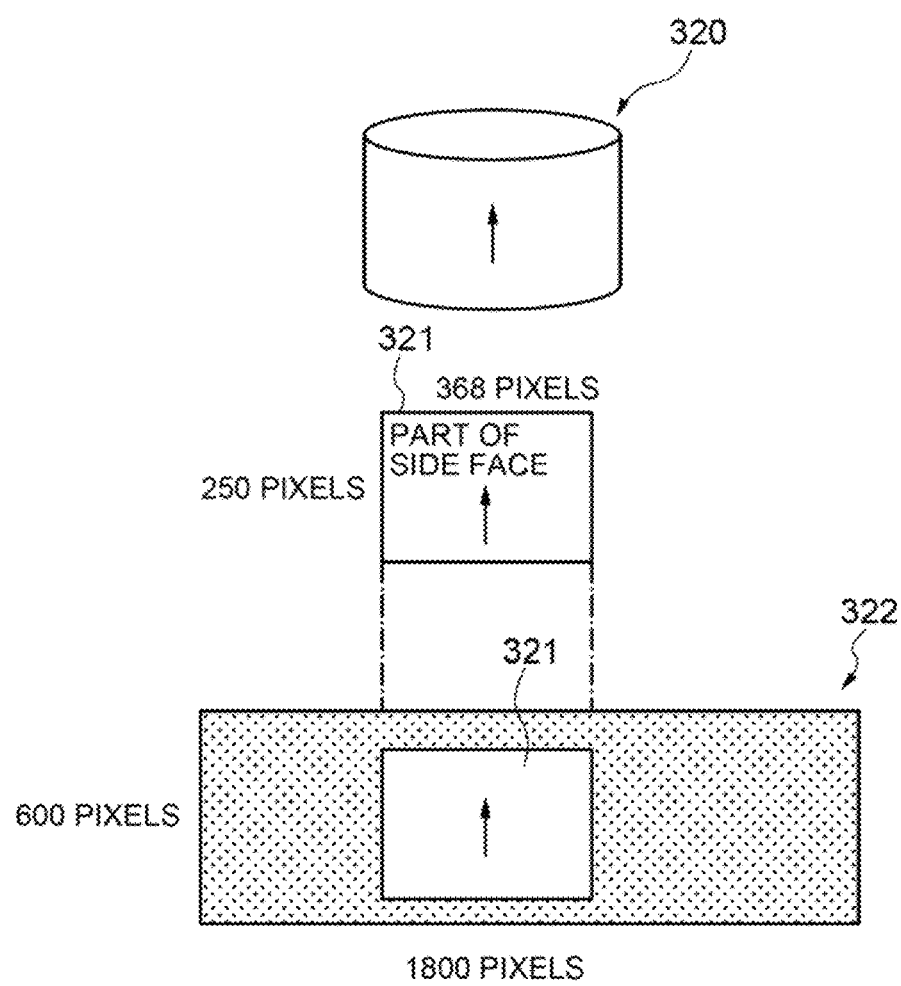
FIG. 10 is a view showing an example of the appearance, part of predetermined region, and matched image of a component having a cylindrical shape to be matched in the first example embodiment of the present invention.

FIG. 10 shows still another example of a component to be matched by the matching unit 162. A component 320 in this example is the same kind of component as the registration target component 220 shown in FIG. 6.

The image acquiring unit 1621 of the matching unit 162 shoots, for example, part of the side face of the component 320 with the camera 110 in accordance with an operation by an operator performing a matching work or by an autonomous operation of the matching unit 162, and thereby acquires a shot image 321 as shown in FIG. 10. Although the shot image 321 may have any image size, it is assumed here as an example that the shot image 321 has a length size of 250 pixels and a width size of 368 pixels.

Next, the image size increasing unit 1622 determines whether or not the image size of the shot image 321 is smaller than the registration image size. It is assumed here that the registration image size is constant regardless of a difference of component individuals and the size is length=600 pixels and width=1800 pixels. In this case, the image size increasing unit 1622 generates, as a matched image, an image obtained by pasting the shot image 321 onto one background image whose image size is the above-mentioned registration image size and all pixels have a predetermined value such as a zero value. A place to paste the shot image 321 is freely selected. However, an orientation to paste the shot image 321 needs to be the same as in the registration image. In the example of FIG. 10, a matched image 322 is generated in which the shot image 321 is pasted at the center portion of the background image in an orientation in which the arrow points upward on the sheet of paper.

Next, the feature value generating unit 1623 extracts, as a matched feature value, a feature value depending on a random pattern existing in image from the matched image 322 by the same method as the method of extracting a matched feature value from the matched image 302 of FIG. 8.

Next, the determining unit 1624 compares the matched feature value with each of the registration feature values stored in the registration DB 152 by the same method as the method described for the component 300 of FIG. 8, and thereby calculates a score representing the similarity between the matched feature value and the registration feature value. Then, the determining unit 1624 determines whether or not the component 320 is an individual identical to any of the components stored in the registration DB 152 based on the scores calculated for the respective registration feature values, and outputs the result.

In the above description, the image acquiring unit 1621 acquires part of the side face of the component 320 as the shot image 321. Meanwhile, even in a case where the image acquiring unit 1621 acquires a shot image of a portion other than the above of the side face of the component 320 or the upper and lower faces of the component 320, the matching unit 162 performs the same operation as when the shot image 321 is acquired, and it can thereby be determined whether or not the component 320 is an individual identical to any of the registration target components 220 stored in the registration DB 152. The reason is that, for the registration target component 220, a registration feature value unique to component individual extracted from a shot image of all the regions of the side face, upper face and lower face is registered in advance in the registration DB 152.

Subsequently, the details of the determining unit 1624 will be described.

Figure 11:
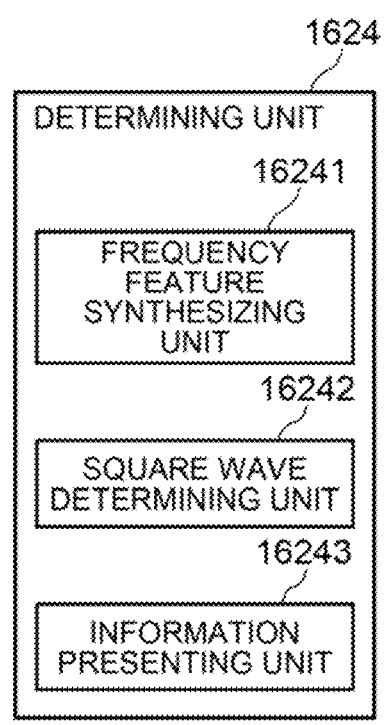
FIG. 11 is a block diagram showing an example of a determining unit in a matching unit of the individual identification apparatus according to the first example embodiment of the present invention.

FIG. 11 is a block diagram showing an example of the determining unit 1624. The determining unit 1624 in this example includes a frequency feature synthesizing unit 16241, a square wave determining unit 16242, and an information presenting unit 16243.

The frequency feature synthesizing unit 16241 is configured to calculate, for each of the registration feature values registered in the registration DB 152, a normalized cross power spectrum of a matched feature value and the registration feature value. The frequency feature synthesizing unit 16241 is further configured to quantize the calculated normalized cross power spectrum and transform the value of each element into binary or ternary data.

The square wave determining unit 16242 is configured to calculate, for each of the quantized cross power spectrums obtained from the frequency feature synthesizing unit 16241, a score indicating a degree that the quantized cross power spectrum is a square wave having a single period. The square wave determining unit 16242 is further configured to perform matching of the matched image and the registration image based on the calculated score. For example, in a case where the best score of a plurality of scores calculated for a plurality of quantized cross power spectrums corresponding to a plurality of registration images satisfies a predetermined reference value, the square wave determining unit 16242 derives a matching result that the matched image and the registration image of the best score match at least partly (an identical partial image exists). On the other hand, in a case where the best score does not satisfy the predetermined reference value, the square wave determining unit 16242 derives a matching result that a registration image that partially matches the matched image does not exist in the registration DB 152.

The information presenting unit 16243 is configured to present the matching result obtained from the square wave determining unit 16242.

Subsequently, a matched feature value and a registration feature value generated by frequency transformation of a matched image and a registration image, respectively, will be described before a description of the details of the frequency feature synthesizing unit 1624 and the square wave determining unit 16242.

Let the matched image and the registration image be two images of $N_1 \times N_2$ pixels, that is, an image $f(n_1,n_2)$ and an image $g(n_1,n_2)$. Moreover, let the discrete space indexes (integers) of two-dimensional image signals be $n_1=-M_1, \ldots, M_1$ and $n_2=-M_2, \ldots, M_2$, where $M_1$ and $M_2$ are positive integers and $N_1=2M_1+1$ and $N_2=2M_2+1$. Then, a first frequency feature $F(k_1,k_2)$ obtained by two-dimensional discrete Fourier transform of the image $f(n_1,n_2)$ and a second frequency feature $G(k_1,k_2)$ obtained by two-dimensional discrete Fourier transform of the image $g(n_1,n_2)$ are given by Equations 1 and 2 shown in FIG. 12. The first frequency feature $F(k_1,k_2)$ corresponds to the matched feature value, and the second frequency feature $G(k_1,k_2)$ corresponds to the registration feature value. In Equations 1 and 2, $k_1=-M_1, \ldots, M_1$ and $k_2=-M_2, \ldots, M_2$ are discrete frequency indexes (integers). Moreover, $W_{N1}$ and $W_{N2}$ are twiddle factors and are given by Equations 3 and 4 shown in FIG. 12. Moreover, $A_F(k_1,k_2)$ and $A_G(k_1,k_2)$ represent amplitude spectrums (amplitude components), and $\theta^F(k_1,k_2)$ and $\theta_G(k_1,k_2)$ represent phase spectrums (phase components), respectively. Moreover, $\Sigma n_1,n_2$ represents summation over all the indexes as shown in Equation 5 of FIG. 12.

Figure 13:
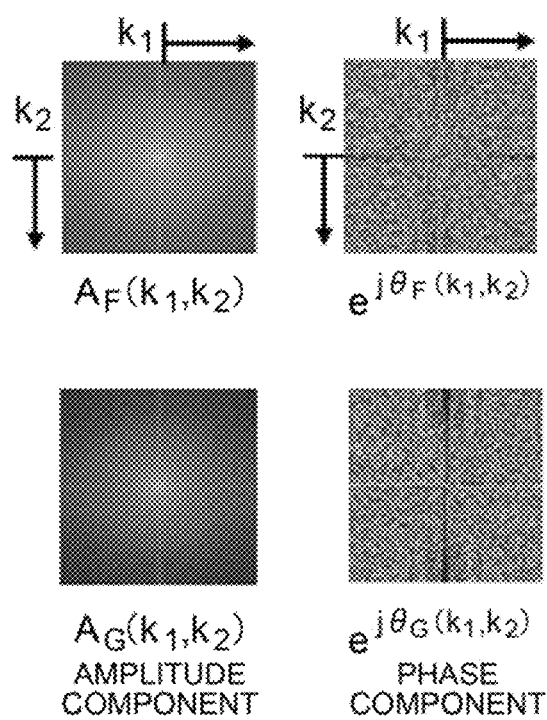
FIG. 13 is a view showing an example of an image of amplitude components $A_F(k_1,k_2)$ and $A_G(k_1,k_2)$ and phase components $\theta_F(k_1,k_2)$ and $\theta_G(k_1,k_2)$.

FIG. 13 shows an example of an image of the amplitude components $A_F(k_1,k_2)$ and $A_G(k_1,k_2)$ and the phase components $\theta_F(k_1,k_2)$ and $\theta_G(k_1,k_2)$.

Next, the frequency feature synthesizing unit 16241 will be described in detail.

Figure 14:
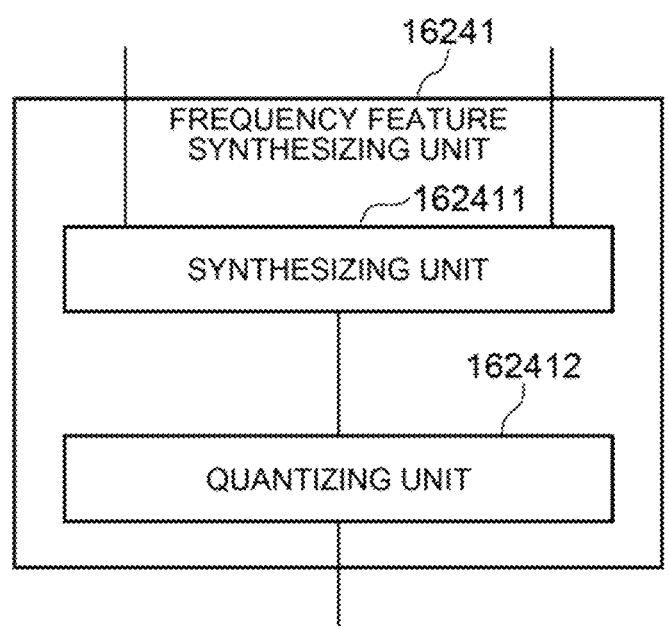
FIG. 14 is a block diagram showing an example of a frequency feature synthesizing unit of the determining unit in the matching unit of the individual identification apparatus according to the first example embodiment of the present invention.

FIG. 14 is a block diagram showing an example of the frequency feature synthesizing unit 16241. The frequency feature synthesizing unit 16241 in this example includes a synthesizing unit 162411 and a quantizing unit 162412.

The synthesizing unit 162411 calculates a normalized cross power spectrum $R(k_1,k_2)$ of the first frequency feature $F(k_1,k_2)$ and the second frequency feature $G(k_1,k_2)$ by Equation 6 shown in FIG. 15. In Equation 6, overline $G(k_1,k_2)$ is the complex conjugate of the second frequency feature $G(k_1,k_2)$. Moreover, $\theta_F(k_1,k_2)-\theta_G(k_1,k_2)$ is a phase difference spectrum of the first frequency feature and the second frequency feature. As shown in Equation 6, the frequency feature synthesizing unit 16241 obtains a cross power spectrum that is the product of the first frequency feature $F(k_1,k_2)$ and the complex conjugate of the second frequency feature $G(k_1,k_2)$ for each element, and further normalizes by the absolute value thereof to calculate the normalized cross power spectrum.

In a case where the image $f(n_1,n_2)$ and the image $g(n_1,n_2)$ are a pair of identical images with displacement, the frequency feature $F(k_1,k_2)$ and frequency feature $G(k_1,k_2)$ of the images and the normalized cross power spectrum $R(k_1,k_2)$ of the two frequency features are given by Equations 7, 8 and 9 shown in FIG. 16, where $\delta_1$, $\delta_2$ indicates a displacement between the image $f(n_1,n_2)$ and the image $g(n_1,n_2)$. That is to say, the image $g(n_1,n_2)$ is an image obtained by translating the image $f(n_1,n_2)$ by $(\delta_1,\delta_2)$. As shown in Equation 9, in a case where the two frequency features $F(k_1,k_2)$ and $G(k_1,k_2)$ to be matched are a pair of identical images, the normalized cross power spectrum $R(k_1,k_2)$ thereof is expressed as a complex sine wave with a single period for each dimension (for each of $k_1$ and $k_2$). On the other hand, in a case where the two frequency features $F(k_1,k_2)$ and $G(k_1,k_2)$ to be matched are not a pair of identical images, the normalized cross power spectrum $R(k_1,k_2)$ thereof does not become a complex sine wave with a single period for each dimension. Moreover, in a case where a pair of two images to be matched have a correlation in an element corresponding to a specific band on the frequency domain, the normalized cross power spectrum $R(k_1,k_2)$ of the frequency features $F(k_1,k_2)$ and $G(k_1,k_2)$ becomes a pattern in which a complex sine wave with a single period partly appears.

Figure 17:
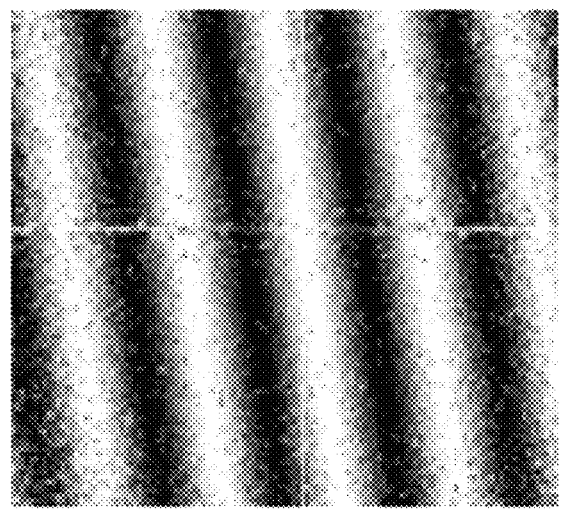
FIG. 17 is a view showing an example of an image of a normalized cross power spectrum $R(k_1,k_2)$ of a pair of identical images.

FIG. 17 shows an example of an image of the normalized cross power spectrum $R(k_1,k_2)$ of a pair of identical images. Considering a bright part as a crest and a dark part as a trough, the normalized cross power spectrum of the pair of identical images has a wave-like image with a single period. Moreover, in a case where a pair of two images to be matched have a correlation in an element corresponding to a specific band on the frequency domain, a wave-like image partly appears, not as a whole, in the normalized cross power spectrum of the pair of partly matching images.

The quantizing unit 162412 quantizes each element of the normalized cross power spectrum obtained by the synthesizing unit 162411 into binary or ternary data. A method of such quantization is freely selected. For example, the following quantizing method may be used.

The quantizing unit 162412 replaces the value (composed of a real part and an imaginary part) of each element of the normalized cross power spectrum obtained by the synthesizing unit 162411 with a value obtained by quantizing a predetermined one of the real part and the imaginary part of the element into a binary or ternary value. For example, let the value of a certain element U be A+Bj, where A and B are real numbers and j is an imaginary unit. In the case of quantizing the element U into a binary value, the quantizing unit 162412 converts A+Bj to "+1" if A≥0 and converts A+Bj to "−1" if A<0, for example. In this example, the element U is quantized into a binary value based on the sign of the real number A of the real part, but the element U may be quantized into a binary value based on the sign of the real number B of the imaginary part. Moreover, in the case of quantizing the element U into a ternary value, the quantizing unit 162412 converts A+Bj to "+1" if A>0, converts A+Bj to "0" if A=0, and converts A+Bj to "−1" if A<0, for example. In this example, the element U is quantized into a ternary value based on the sign of the real number A of the real part, but the element U may be quantized into a ternary value based on the sign of the real number B of the imaginary part. According to the abovementioned quantizing method, the quantizing unit 162412 expresses each element of the normalized cross power spectrum obtained by the synthesizing unit 162411 as 1-bit or 2-bit data.

The reason why the quantizing unit 162412 quantizes each element of a normalized cross power spectrum into binary or ternary data is as follows.

In general, the real part and the imaginary part of each element of the normalized cross power spectrum $R(k_1,k_2)$ are calculated as real number values (floating point numbers) and require many bits to represent each element (for example, 64-bit data for double precision floating point number and 32-bit data for single precision floating point number). For the purpose of alignment between images to that requires to obtain a displacement between the images, it is important to obtain a normalized cross power spectrum as a complex sine wave with the minimum error and obtain the period of the complex sine wave with precision. On the other hand, for the purpose of determination whether or not two images are identical as in this example embodiment of the present invention, there is no need to accurately calculate a normalized cross power spectrum as a complex sine wave. That is to say, it is important whether or not the normalized cross power spectrum is distributed as periodic data with repetition. Even if each element of the normalized cross power spectrum is quantized into binary or ternary data and the amount of information of each element is reduced, it can be determined whether or not the obtained data distribution is distribution as a periodic repetition pattern. Therefore, even if the amount of the information is reduced, the precision of matching and identification does not deteriorate extremely. Based on this, in this example embodiment, the quantizing unit 162412 quantizes each element of the normalized cross power spectrum obtained by the synthesizing unit 162411 into binary or ternary data.

Figure 18:
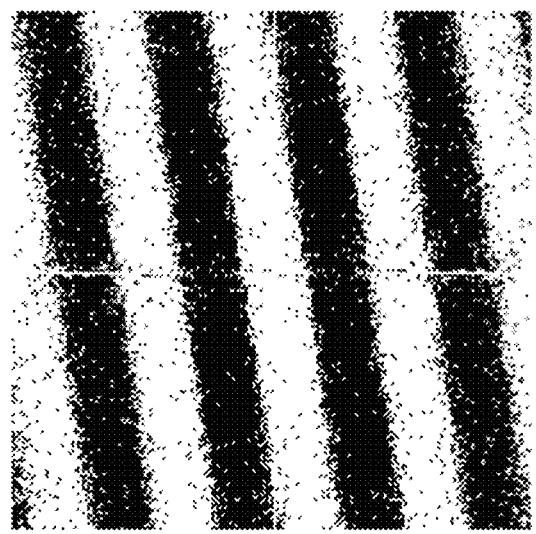
FIG. 18 is a view showing an example of an image obtained by quantizing a normalized cross power spectrum of a pair of identical images into binary data.

FIG. 18 shows an example of an image in which the normalized cross power spectrum $R(k_1,k_2)$ of a pair of identical images is quantized into binary data. The data obtained by quantizing the normalized cross power spectrum of the pair of identical images into binary data can also keep a wave pattern with a single period in which a bright part and a dark part are considered as a crest and a trough, respectively. Therefore, even if the normalized cross power spectrum that is real number data generally expressed by 32 bits or 64 bits is quantized into binary (1-bit) or ternary (2-bit) data and the amount of the data is reduced, it is possible to determine whether or not there is a correlation between the input images without lowering the precision. That is to say, it is possible to distinguish a pair of identical images having a correlation from a pair of different images having no correlation with a small amount of data without impairing the precision.

Next, the square wave determining unit 16242 will be described in detail. As mentioned before, the square wave determining unit 16242 obtains as a numerical value a degree that a normalized cross power spectrum with each element quantized into a binary or ternary value calculated by the frequency feature synthesizing unit 16241 is a square wave with a single period, and outputs as a score.

Example 1 of Square Wave Determining Unit 16242

Figure 19:
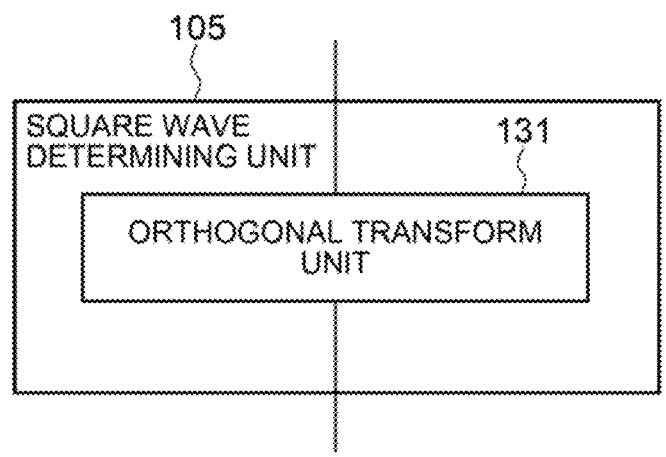
FIG. 19 is a block diagram showing an example of a square wave determining unit in the determining unit included by the matching unit of the individual identification apparatus according to the first example embodiment of the present invention.

FIG. 19 is a block diagram showing an example of the square wave determining unit 16242. The square wave determining unit 16242 in this example includes, for example, an orthogonal transform unit 162421 that performs orthogonal transform using a Hadamard matrix. A Hadamard matrix is a square matrix whose components are "+1" and "−1" and whose rows are orthogonal to each other. Considering a case where a Hadamard matrix $H_m$ is an m×m matrix and $m=2^P$ (P is a positive integer), the Hadamard matrix $H_m$ is defined as Equations 10 and 11 of FIG. 20.

The orthogonal transform unit 162421 is configured to perform orthogonal transform using a Hadamard matrix on a normalized cross power spectrum quantized into binary or ternary values, and output the maximum value of the output as a score. In a case where the quantized normalized cross power spectrum is a square wave having a single period, a sharp peak value appears in the period in the output of the orthogonal transform unit 162421. On the other hand, in a case where the quantized normalized cross power spectrum is not a square wave having a single period, a sharp peak value does not appear in the output of the orthogonal transform unit 162421. Therefore, the maximum value of the output of the orthogonal transform unit 162421 can be a score representing a degree that the quantized normalized cross power spectrum is a square wave having a single period. The orthogonal transform unit 162421 performs image matching based on the calculated score.

Figure 21:
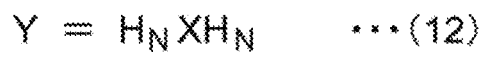

The orthogonal transform using the Hadamard matrix performed by the orthogonal transform unit 162421 is described by Equation 12 of FIG. 21. In Equation 12, $H_N$ is the Hadamard matrix, X is an input signal of N×N (quantized cross power spectrum), and Y is an output signal of N×N (score). Since the operation of Equation 12 can be executed by logical operation such as exclusive OR (XOR) and bit counting and a combination of addition and subtraction in the case of a normalized cross power spectrum quantized into binary values ("+1" and "−1"), high-speed processing is possible. Moreover, since the operation of Equation 12 can be executed by logical operation such as exclusive OR (XOR) and bit counting and a combination of addition and subtraction on elements of "+1" and "−1" without executing the operation on an element having the value of "0" in the case of a normalized cross power spectrum quantized into ternary values ("+1", "0", and "−1"), high-speed processing is possible.

Example 2 of Square Wave Determining Unit 16242

Figure 22:
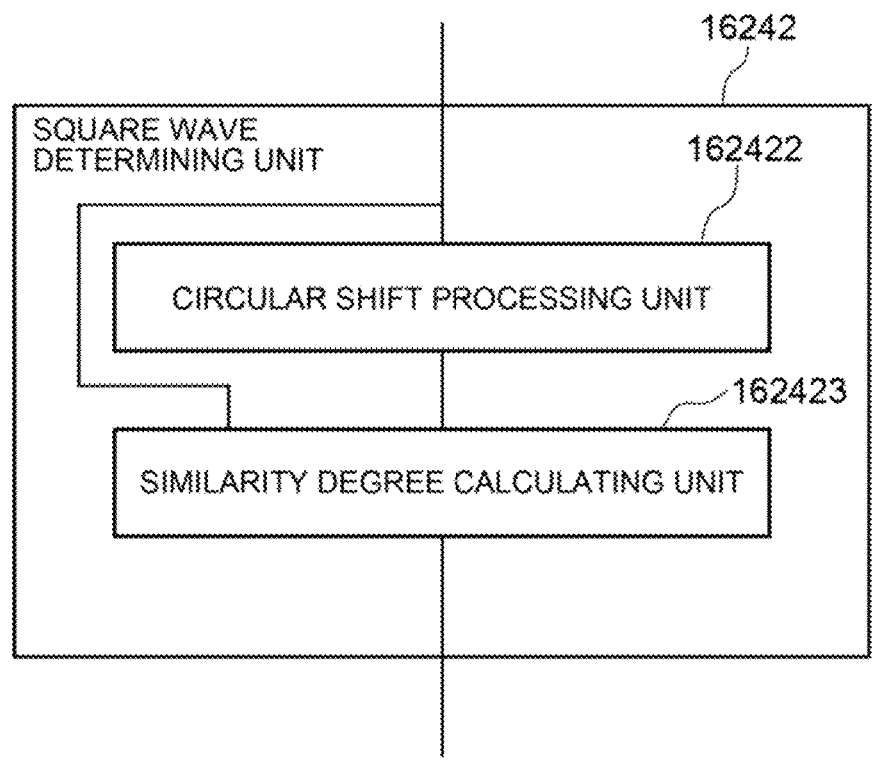
FIG. 22 is a block diagram showing another example of the square wave determining unit in the determining unit included by the matching unit of the individual identification apparatus according to the first example embodiment of the present invention.

FIG. 22 is a block diagram showing another example of the square wave determining unit 16242. The square wave determining unit 16242 in this example includes a circular shift processing unit 162422 and a similarity calculating unit 162423.

The circular shift processing unit 162422 is configured to input a normalized cross power spectrum whose elements are quantized into binary or ternary values (hereinafter referred to as data before circular shift), and output a quantized cross power spectrum whose elements are circular-shifted by a rotate operation without carry or the like (hereinafter referred to as data after circular shift). Moreover, the circular shift processing unit 162422 is configured to output a plurality of data after circular shift having different circular shift amounts by variously changing the circular shift amount.

The similarity degree calculating unit 162423 is configured to input data before circular shift and a plurality of data after circular shift of different circular shift amounts, and calculate a plurality of similarity degrees between the data before circular shift and the plurality of data after circular shift. The similarity degree calculating unit 162423 is also configured to output the maximum similarity degree among the calculated similarity degrees as a score. The similarity degree calculating unit 162423 performs image matching based on the calculated score.

In a case where the data before circular shift is a square wave having a single period, when the data before circular shift is circular-shifted by the circular shift processing unit 162422, a square wave having the same single period as the data before circular shift periodically appears as data after circular shift. On the other hand, in a case where the data before circular shift is not a square wave having a single period, even when the data before circular shift is circular-shifted to various shift amounts by the circular shift processing unit 162422, the data after circular shift having the same pattern as the data before circular shift does not appear. Therefore, by repeating calculation of the similarity degree between the data before circular shift and the data after circular shift while changing the circular shift amount, and using the maximum value of the similarity degrees as the score, it is possible to calculate a score representing a degree that the quantized cross power spectrum is a square wave having a single period.

The circular shift processing unit 162422 described above can be implemented by a bit shift operation. Moreover, the similarity degree calculating unit 162423 described above can be implemented by exclusive OR (XOR) and bit count calculation for calculating the Hamming distance between the data before circular shift and the data after circular shift. Therefore, it is possible to perform higher-speed calculation than the autocorrelation calculation for real number data.

Example 3 of Square Wave Determining Unit 16242

Figure 23:
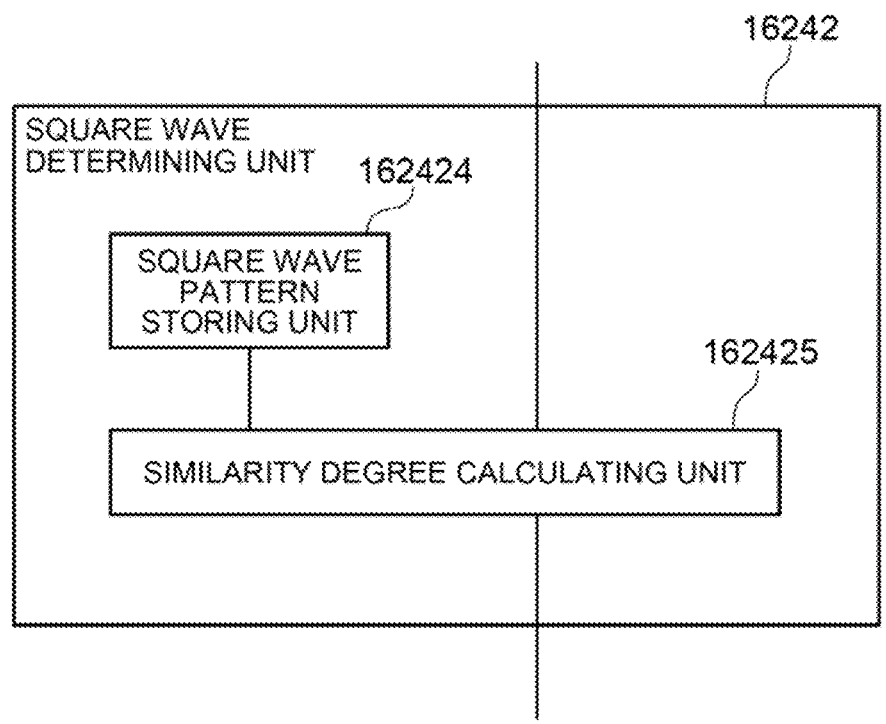
FIG. 23 is a block diagram showing still another example of the square wave determining unit in the determining unit included by the matching unit of the individual identification apparatus according to the first example embodiment of the present invention.

FIG. 23 is a block diagram showing still another example of the square wave determining unit 16242. The square wave determining unit 16242 in this example includes a square wave pattern storing unit 162424 and a similarity degree calculating unit 162425.

The square wave pattern storing unit 162424 is configured to store a plurality of reference square wave patterns. A certain one reference square wave pattern is a quantized cross power spectrum obtained by quantizing each element of a normalized cross power spectrum of a pair of identical images having a displacement of certain value into a binary or ternary value. The plurality of reference square wave patterns stored in the square wave pattern storing unit 162424 have different displacements from each other.

The similarity degree calculating unit 162425 is configured to input a normalized cross power spectrum obtained by quantizing each element into a binary or ternary value (hereinafter referred to as a matched square wave pattern) from the frequency feature synthesizing unit 16241. The similarity degree calculating unit 162425 is also configured to input a plurality of reference square wave patterns from the square wave pattern storing unit 162424. The similarity degree calculating unit 162425 is also configured to calculate a plurality of similarity degrees between the input matched square wave pattern and the plurality of reference square wave patterns, and output the maximum similarity degree among the plurality of similarity degrees as a score. The degree of similarity between the matched square wave pattern and the reference square wave pattern can be calculated by, for example, the Hamming distance calculation. The similarity degree calculating unit 162425 performs image matching based on the calculated score.

In a case where there is a correlation in a pair of identical individuals, that is, a correlation between two input images, a normalized cross power spectrum thereof becomes a square wave pattern having a single period, and the period corresponds to a displacement between the two images. Therefore, it is possible to obtain the range of a repetition error of the displacement at the time of shooting and thereby infer a square wave pattern that occurs when there is a correlation. These patterns are stored beforehand as the reference square wave patterns in the square wave pattern storing unit 162424, the Hamming distance from the matched square wave pattern is calculated by the similarity degree calculating unit 162425, a score representing that the matched square wave pattern is a square wave having a single period is calculated, and identification is thereby performed.

According to the determining unit 1624 described above, it is possible to perform matching between a matched image and a registration image at high speeds. The reason is that a normalized cross power spectrum of the frequency feature of the matched image and the frequency feature of the registration image is quantized, a score representing a degree that the quantized cross power spectrum is a square value with a single period is calculated, and matching between the matched image and the registration image is performed based on the score. That is to say, since each element of the normalized cross power spectrum obtained by the synthesizing unit 162411 is quantized into binary or ternary data by the quantizing unit 16241 in the determining unit 1624, it is possible to significantly reduce the amount of data processed by the square wave determining unit 16242 as compared with the method of determining whether a normalized cross power spectrum is a complex sine wave having a single period without quantizing the normalized cross power spectrum.

In the above description, the frequency feature synthesizing unit 16241 calculates a quantized cross power spectrum by quantizing each element of a normalized cross power spectrum of the frequency feature of a matched image and the frequency feature of a registration image into binary or ternary data. However, even if after calculation of a cross power spectrum of the frequency feature of a matched image and the frequency feature of a registration image, the sign (+, −) of each element of the cross power spectrum is converted to "+1, −1" or "+1, 0, −1" without normalization with an amplitude component, the same quantized cross power spectrum as described above can be calculated. Therefore, the frequency feature synthesizing unit 16241 may be configured to calculate a cross power spectrum of the frequency feature of a matched image and the frequency feature of a registration and thereafter quantize into binary or ternary values based on the sign (+, −) of at least one of the real part and the imaginary part of each element.

Thus, according to this example embodiment, it is possible to increase the convenience of an individual identification apparatus that determines whether or not a matching target component is identical to a registration target component. The reason is that the matching unit 162 calculates a score representing a degree that a partial image similar to a matched image obtained by shooting part of a predetermined region of a matching target component exists in a registration image obtained by shooting a predetermined region of a registration target component, and it is determined whether or not the matching target component is identical to the registration target component based on the score. That is to say, at the time of matching, there is no need to shoot the entire region of a predetermined region of a component, and it is enough to shoot part of the predetermined region.

Further, according to this example embodiment, it is possible to prevent a decrease of an identification ability, which is a degree to which different components can be identified. The reason is that a partial region of a specific region of a matching target component is a region having an area equal to or larger than a minimum area required to obtain a random pattern necessary to secure an identification ability that is a degree to which different components can be identified for as many component individuals as possible.

Further, according to this example embodiment, it is possible to determine whether or not a matching target component is identical to a registration target component at high speeds as compared with the individual identification method relating to the present invention. The reason is as follows.

The individual identification method relating to the present invention needs, for example, in matching of the component 300 having a rectangular parallelepiped shape shown in FIG. 8, to acquire the shot images of a total of six faces including an upper face, a lower face, a front side face, a back side face, a left side face and a right side face, and compare the shot images of the same face for each of the registration target components stored in the registration DB 152. However, there is a case where the respective faces of the matching target component 300 cannot be associated with the respective faces of the registration target component 200 on a one-to-one basis. For example, the upper face and lower face of a component having a rectangular parallelepiped shape have the same shape and same size, and cannot be distinguished from each other. Therefore, there is a case where at the time of matching, for each shot image of a face acquired from the matching target component 300, the shot image of the face needs to be compared with not one face of the registration target component but a plurality of faces thereof as illustrated below. As a result, a screen size to compare increases, and the time required for the comparison process increases.

(1) Comparison between the shot image of the upper face of the component 300 (600 pixels×400 pixels) and the shot image of the upper face of the component 200 (600 pixels×400 pixels)

(2) Comparison between the shot image of the upper face of the component 300 (600 pixels×400 pixels) and the shot image of the lower face of the component 200 (600 pixels×400 pixels)

(3) Comparison between the shot image of the lower face of the component 300 (600 pixels×400 pixels) and the shot image of the upper face of the component 200 (600 pixels×400 pixels)

(4) Comparison between the shot image of the lower face of the component 300 (600 pixels×400 pixels) and the shot image of the lower face of the component 200 (600 pixels×400 pixels)

(5) Comparison between the shot image of the front side face of the component 300 (600 pixels×300 pixels) and the shot image of the front side face of the component 200 (600 pixels×300 pixels)

(6) Comparison between the shot image of the front side face of the component 300 (600 pixels×300 pixels) and the shot image of the back side face of the component 200 (600 pixels×300 pixels)

(7) Comparison between the shot image of the back side face of the component 300 (600 pixels×300 pixels) and the shot image of the front side face of the component 200 (600 pixels×300 pixels)

(8) Comparison between the shot image of the back side face of the component 300 (600 pixels×300 pixels) and the shot image of the back side face of the component 200 (600 pixels×300 pixels)

(9) Comparison between the shot image of the left side face of the component 300 (400 pixels×300 pixels) and the shot image of the left side face of the component 200 (400 pixels×300 pixels)

(10) Comparison between the shot image of the left side face of the component 300 (400 pixels×300 pixels) and the shot image of the right side face of the component 200 (400 pixels×300 pixels)

(11) Comparison between the shot image of the right side face of the component 300 (400 pixels×300 pixels) and the shot image of the left side face of the component 200 (400 pixels×300 pixels)

(12) Comparison between the shot image of the right side face of the component 300 (400 pixels×300 pixels) and the shot image of the right side face of the component 200 (400 pixels×300 pixels)

On the other hand, according to this example embodiment, for example, in the case of matching of the component 300 having a rectangular parallelepiped shape shown in FIG. 8, only the following comparison is performed.

(1) Comparison between the matched image of the component 300 (1800 pixels×600 pixels) and the registration image of the component 200 (1800 pixels×600 pixels)

That is to say, in this example embodiment, it is determined whether or not a matching target component is identical to a registration target component based on a cross power spectrum calculated by frequency synthesis of a registration feature value extracted from a registration image obtained by arranging shot images acquired from a plurality of different faces of the registration target component into one image and a matched feature value extracted from a matched image obtained by enlarging an image acquired from any one of the plurality of faces. By thus performing matching of one registration image and one matched image regardless of the number of shot images of a registration target component, it is possible to reduce overhead as compared with the method of repeatedly performing matching between each of a plurality of shot images of a registration target component and a matched image multiple times. The reason why there is no problem in matching even if shot images acquired from a plurality of different faces of a registration target component are arranged as one registration image is that a random pattern existing on the surface of a component individual is a literally random pattern and it is extremely difficult to intentionally create the same one. That is to say, even if images of mutually different regions of a component are freely arranged and a predetermined value such as a zero value is inserted between the images, a random pattern identical to a random pattern existing on the surface of another individual is never created.

Subsequently, a modified example of this example embodiment will be described.

In the above description, the registering unit 161 stores, for each registration target component, a feature value extracted from an image of a predetermined region of the component into the registration DB 152. However, the registering unit 161 may be configured to store a registration image from which the feature value is extracted into the registration DB 152 instead of storing the feature value into the registration DB 152. In such a case, the feature value generating unit 1613 may be omitted. Moreover, the determining unit 1624 of the matching unit 162 may be configured to generate a registration feature value to be compared with a matched feature value generated by the feature value generating unit 1623 from a registration image stored in the registration DB 152 by using the feature value generating unit 1623 at the time of matching.

In the above description, the determining unit 1624 of the matching unit 162 compares a feature value extracted from a matched image with a feature value extracted from a registration image and thereby calculates a score representing a degree that a partial image similar to the matched image exists in the registration image. However, the determining unit 1624 of the matching unit 162 may be configured to compare the matched image with the registration image by using a method such as template matching and thereby calculate a score representing a degree that a partial image similar to the matched image exists in the registration image.

In the above description, one individual identification apparatus 100 includes the registering unit 161 and the matching unit 162. However, an individual identification apparatus that includes the registering unit 161 but does not include the matching unit 162, or an individual identification apparatus that includes the matching unit 162 but does not include the registering unit 161 are possible.

Second Example Embodiment

Figure 24:
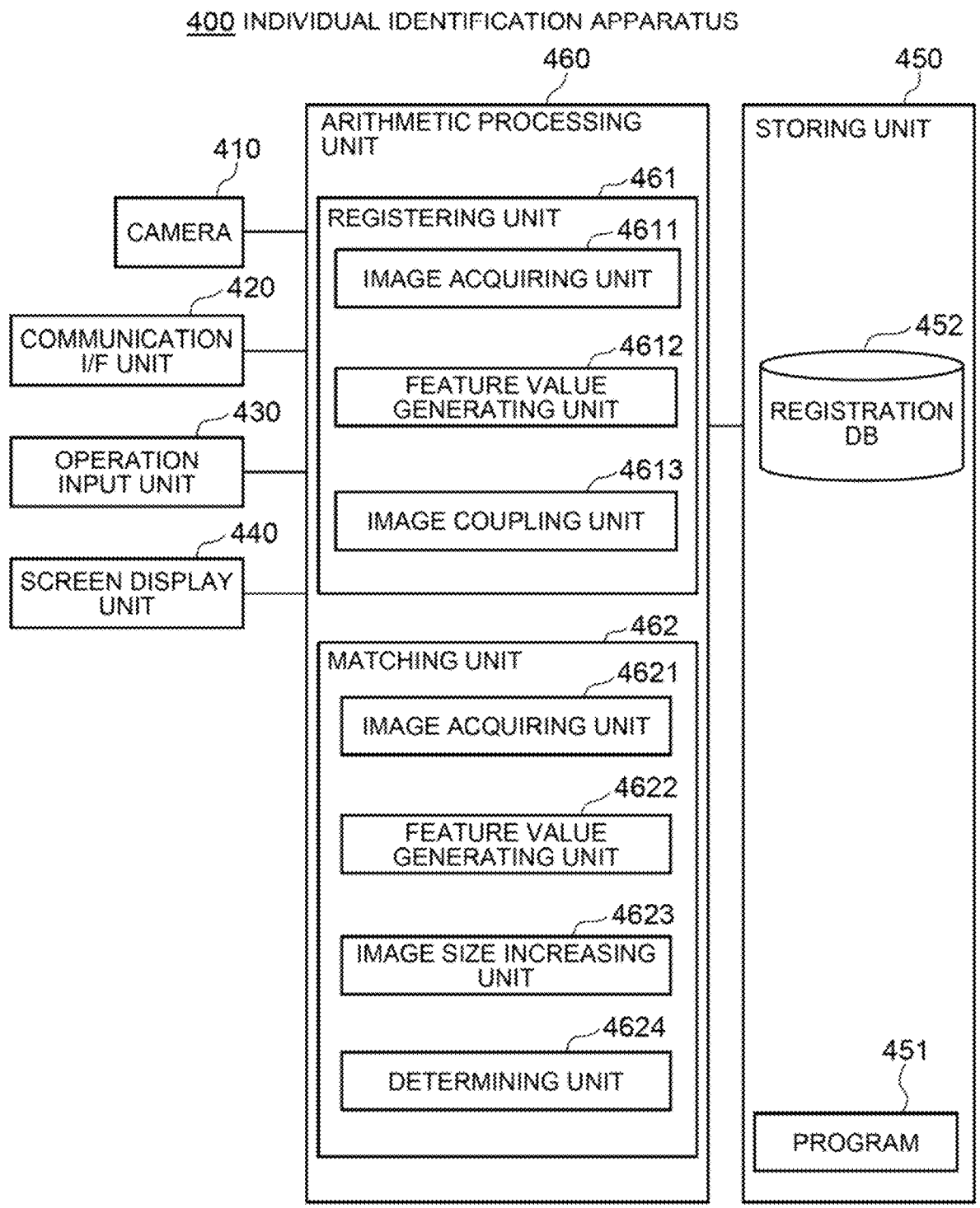
FIG. 24 is a block diagram of an individual identification apparatus according to a second example embodiment of the present invention.

FIG. 24 is a block diagram of an individual identification apparatus 400 according to a second example embodiment of the present invention. Referring to FIG. 24, the individual identification apparatus 400 includes a camera 410, a communication I/F unit 420, an operation input unit 430, a screen display unit 440, a storing unit 450, and an arithmetic processing unit 460. Among them, the camera 410, the communication I/F unit 420, the operation input unit 430, and the screen display unit 440 are configured in the same manner as the camera 110, the communication I/F unit 120, the operation input unit 130, and the screen display unit 140 of the individual identification apparatus 100 shown in FIG. 1.

The storing unit 450 is composed of a storage device such as a hard disk and a memory, and is configured to store processing information and a program 451 that are necessary for various processing in the arithmetic processing unit 460. The program 451 is a program that is loaded to and executed by the arithmetic processing unit 460 to realize various processing units, and is previously loaded from an external device or a recording medium, which are not shown, via a data input/output function such as the communication I/F unit 420 and stored in the storing unit 450. Major processing information stored in the storing unit 450 is a registration DB (database) 452.

The registration DB 452 is a database in which a registration image unique to component individual generated from an image obtained by shooting a registration target component with the camera 410 is stored in association with an individual number.

The arithmetic processing unit 460 has a processor such as a MPU and a peripheral circuit thereof, and is configured to load the program 451 from the storing unit 450 and execute to make the abovementioned hardware cooperate with the program 451 and realize various processing units. Major processing units realized by the arithmetic processing unit 460 are a registering unit 461 and a matching unit 452.

The registering unit 461 is configured to generate a feature value unique to component individual from an image obtained by shooting a registration target component and register the generated feature value into the registration DB 452 in association with the individual number of the component. The registering unit 461 has an image acquiring unit 4611, a feature value generating unit 4612, and an image coupling unit 4613. Among them, the image acquiring unit 4611 is configured in the same manner as the image acquiring unit 1611 shown in FIG. 1. That is to say, the image acquiring unit 4611 is configured to, for each registration target component, acquire a plurality of images obtained by shooting a predetermined region of the component multiple times as necessary from the camera 410.

The feature value generating unit 4612 is configured to extract, for each registration target component, a feature value depending on a random pattern existing in image from the shot image generated by the image acquiring unit 4611. Specifically, the feature value generating unit 4612 acquires, for each shot image, a Fourier-Mellin feature image obtained by performing Fourier-Mellin transform on the shot image as a feature value. For example, the feature value generating unit 4612 performs frequency transform (for example, discrete Fourier transform) on the shot image and thereby calculates a two-dimensional amplitude spectrum that is the result of transformation into the frequency domain. Next, the feature value generating unit 4612 performs polar coordinate transformation or logarithmic polar coordinate transformation on the two-dimensional amplitude spectrum and thereby calculates a Fourier-Mellin feature image. Changes in magnification and rotation of the original shot image are converted into changes in translation of the Fourier-Mellin feature image.

The image coupling unit 4613 is configured to generate, for each registration target component, a registration image as one image by arranging the Fourier-Mellin feature images of the respective shot images generated by the feature value generating unit 4612. The image coupling unit 4613 is also configured to register, for each registration target component, the registration image into the registration DB 452 in association with the individual number of the component.

The matching unit 462 is configured to calculate a score representing a degree that a partial image similar to an image obtained by shooting at least part of a predetermined region of a matching target component exists in a shot image of a predetermined region of the registration target component. The matching unit 462 is also configured to determine whether or not the matching target component is identical to the registration target component based on the score. The matching unit 462 includes an image acquiring unit 4621, a feature value generating unit 4622, an image size increasing unit 4623, and a determining unit 4624.

The image acquiring unit 4621 is configured to acquire an image obtained by shooting at least part of a predetermined region of a matching target component from the camera 410. Herein, it is desired that at least part of a predetermined region is a region having an area equal to or more than a minimum area to obtain a random pattern necessary for securing an identification ability, which is a degree of ability to identify different components, for as many component individuals as possible.

The feature value generating unit 4622 is configured to extract a feature value depending on a random pattern existing in image from the shot image acquired by the image acquiring unit 4621. Specifically, the feature value generating unit 4622 is configured to generate a Fourier-Mellin feature image by performing Fourier-Mellin transform on the shot image.

The image size increasing unit 4622 is configured to, in a case where the size of the Fourier-Mellin feature image generated by the feature value generating unit 4622 is smaller than the size of a registration image, increase the size of the Fourier-Mellin feature image to the same size as that of the registration image and thereby generate a matched image. For example, the image size increasing unit 4622 is configured to generate, as a matched image, a composite image obtained by pasting the Fourier-Mellin feature image generated by the feature value generating unit 4622 to one background image whose size is the same as that of the registration image and whose all pixels have a predetermined value such as a zero value. In other words, the image size increasing unit 4622 is configured to generate, for example, an image that the size of the Fourier-Mellin feature image generated by connecting pixels having a predetermined value such as a zero value by the feature value generating unit 4622 is increased to the same size as that of the registration image.

The determining unit 4624 is configured to, for each of the registration images stored in the registration DB 452, calculate a score representing a degree of similarity between the matched image generated by the image size increasing unit 4623 and the registration image, and determine whether or not the matching target component is identical to any of the registration target components based on the scores. The determining unit 4624 may calculate the score by the same method as the determining unit 1624 shown in FIG. 1. Alternatively, the determining unit 4624 may synthesize the matched image and the registration image to calculate a cross power spectrum, and calculate a score representing a degree that the cross power spectrum is a wave having a single period as the score representing the similarity between the matched image and the registration image (for example, see Patent Document 2). Alternatively, the determining unit 4624 may calculate a correlation value map by performing inverse Fourier transform on the cross power spectrum, calculate the presence/absence of a maximum peak and an evaluation value of the sharpness of the peak in the correlation map, and finally calculate the score representing the similarity between the matched image and the registration image. The determining unit 4624 is also configured to display the result of determination on the screen display unit 440 or/and output to an external device through the communication I/F unit 420.

Figure 25:
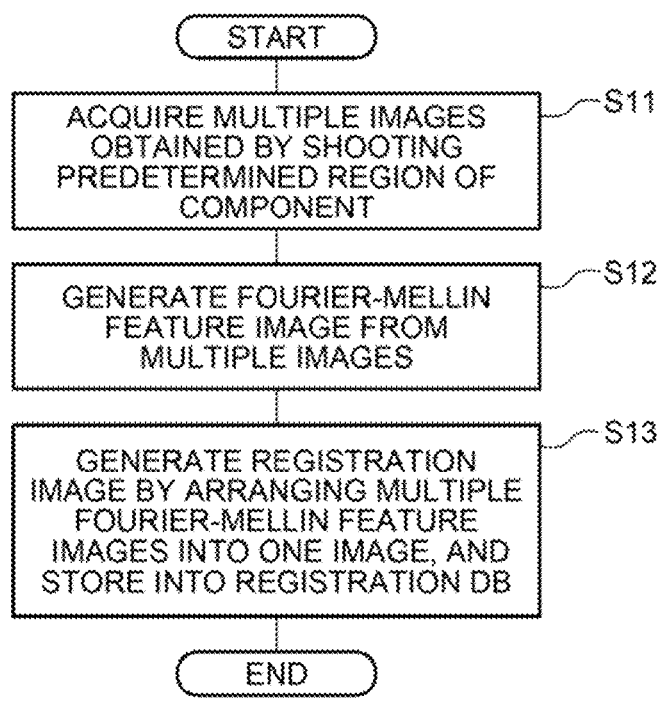
FIG. 25 is a flowchart showing an example of a registration operation of the individual identification apparatus according to the second example embodiment of the present invention.
Figure 26:
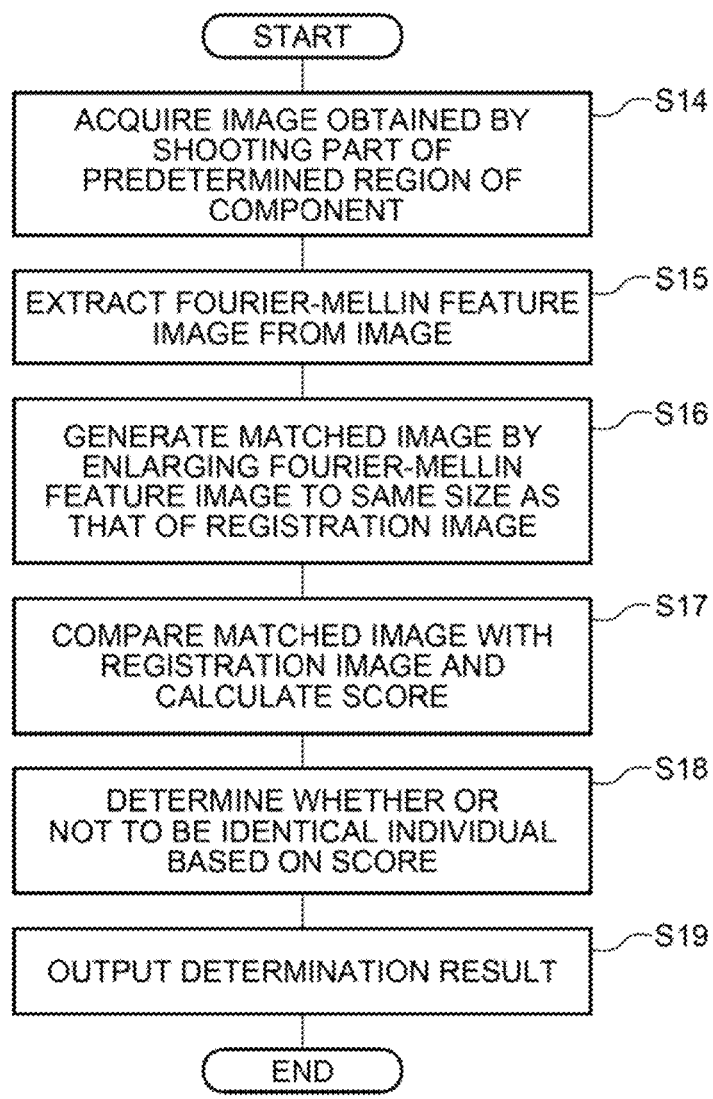
FIG. 26 is a flowchart showing an example of a matching operation of the individual identification apparatus according to the second example embodiment of the present invention.

Subsequently, an operation of the individual identification apparatus 400 will be described. The operation of the individual identification apparatus 400 is roughly classified into a registration operation and a matching operation. FIG. 25 is a flowchart showing an example of the registration operation of the individual identification apparatus 400. FIG. 26 is a flowchart showing an example of the matching operation of the individual identification apparatus 400.

First, the registration operation of the individual identification apparatus 400 will be described. In the registration operation, as shown in FIG. 25, the image acquiring unit 4611 acquires, for each registration target component, a plurality of images obtained by shooting a predetermined region of the component multiple times as necessary from the camera 410 (step S11). Next, the feature value generating unit 4612 calculates, for each registration target component, a Fourier-Mellin feature image depending on a random pattern existing in image from the shot images generated by the image acquiring unit 4611 (step S12). Next, the image coupling unit 4613 generates, for each registration target component, a registration image by arranging the Fourier-Mellin feature images of the respective shot images generated by the feature value generating unit 4612 into one image, and stores into the registration DB 452 in association with the individual number of the component (step S13). This completes the registration operation.

Next, the matching operation will be described. In the matching operation, as shown in FIG. 26, first, the image acquiring unit 4621 acquires an image obtained by shooting at least part of a predetermined region of the matching target component from the camera 410 (step S14). Next, the feature value generating unit 4622 generates a Fourier-Mellin feature image from the image acquired by the image acquiring unit 4621 (step S15). Next, the image size increasing unit 4622 generates a matched image by increasing the size of the Fourier-Mellin feature image generated by the feature value generating unit 4622 to the same size as that of the registration image (step S16). Next, the determining unit 4624 calculates, for each of the registration images stored in the registration DB 452, a score representing a degree of similarity between the matched image generated by the image size increasing unit 4623 and the registration image (step S17). Next, the determining unit 4624 determines whether or not the matching target component is identical to any of the registration target components based on the scores (step S18). Next, the determining unit 4624 outputs the result of determination (step S19).

Subsequently, the registering unit 461 and the matching unit 462 will be described in more detail.

First, the registering unit 461 will be described in detail.

Figure 27:
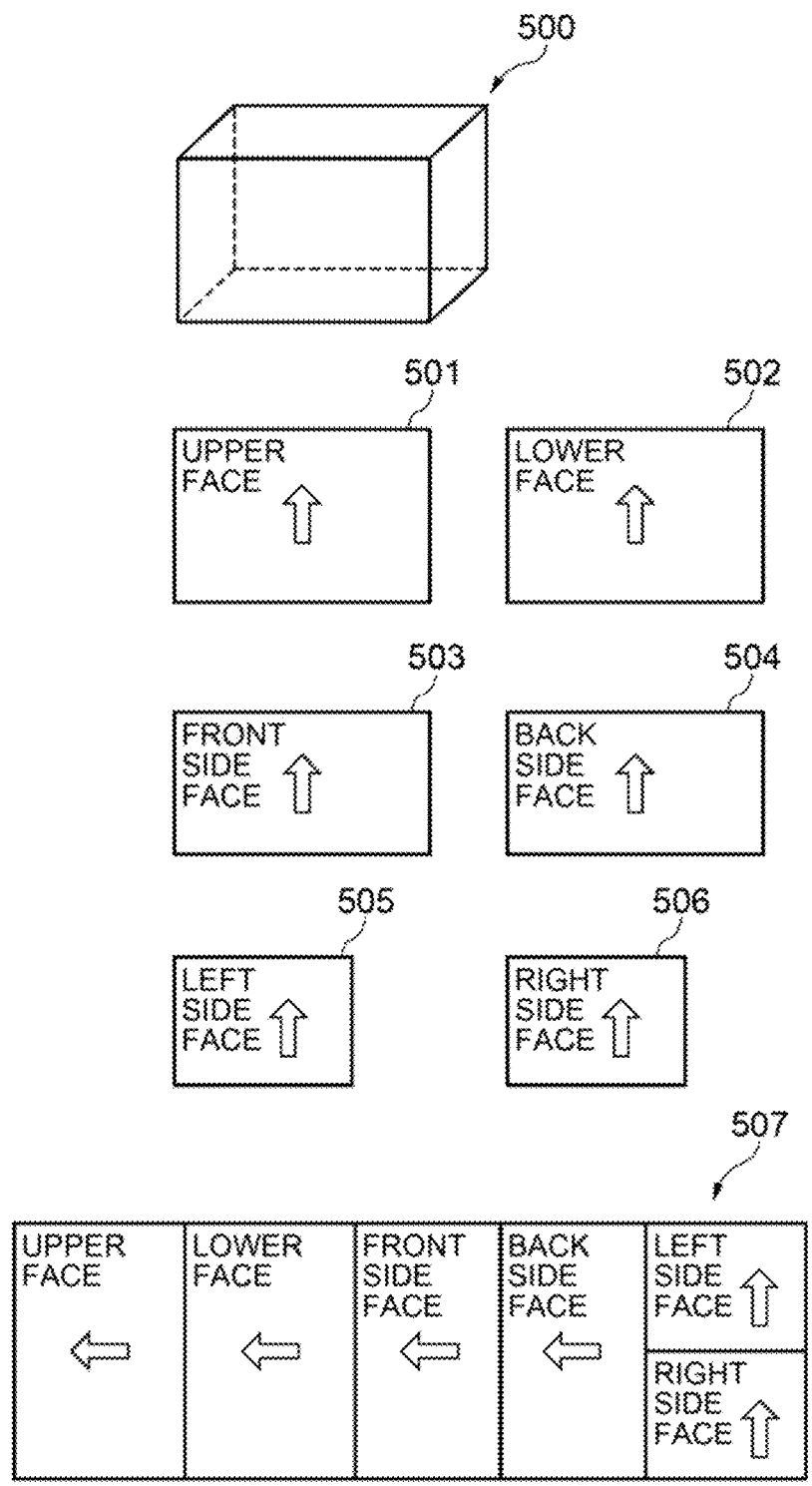
FIG. 27 is a view showing an example of the appearance, predetermined region, and registration image of a component having a rectangular parallelepiped shape to be registered in the second example embodiment of the present invention.

FIG. 27 shows an example of a component 400 to be registered by the registering unit 461. The component 400 in this example is the same component as the component 200 shown in FIG. 4. In this example, a Fourier-Mellin feature image depending on a random pattern unique to component individual is extracted from all the regions of the six faces of the component 400. That is to say, a predetermined region of the component 400 is all the six faces.

The image acquiring unit 4611 of the registering unit 461 shoots each face of the component 400 from the front thereof with the camera 410 in accordance with an operation by an operator performing a registration work or by an autonomous operation of the registration unit 461, and thereby acquires the shot image of the face. Next, the feature value generating unit 4612 generates a Fourier-Mellin feature image of each face from the shot image of the face. That is to say, as shown in FIG. 27, the feature value generating unit 4612 generates a Fourier-Mellin feature image 501 of upper face shot image, a Fourier-Mellin feature image 502 of lower face shot image, a Fourier-Mellin feature image 503 of front side face shot image, a Fourier-Mellin feature image 504 of back side face shot image, a Fourier-Mellin feature image 505 of right side face shot image, and a Fourier-Mellin feature image 506 of left side face shot image as shown in FIG. 27. In FIG. 27, the Fourier-Mellin feature image is marked with a thick arrow. This thick arrow is a symbol for the sake of convenience for determining the orientation of the Fourier-Mellin feature image. The same applies to a thick arrow shown in another drawing such as FIG. 28.

Next, the image coupling unit 4613 arranges the six Fourier-Mellin feature images to generate a registration image and stores into the registration DB 452. In the case of Fourier-Mellin feature images of shot images of a plurality of faces where a matched image is not generated across the boundaries of the adjacent faces such as the six faces of a rectangular parallelepiped, the order and spacing of arrangement are freely selected. However, the orientations of the Fourier-Mellin feature images need to be kept in an orientation determined for each same shot image of the same kind of component. Moreover, the plurality of Fourier-Mellin feature images need to not overlap each other. In the example of a registration image shown in FIG. 27, the registration image 507 is generated by arranging the Fourier-Mellin feature images 501, 502, 503 and 504 in a row so as to be in contact with each other and in an orientation that the arrows point leftward on the sheet of paper and arranging, at one end of the row, the Fourier-Mellin feature values 505 and 506 in two rows in an orientation that the arrows point upward on the sheet of paper.

Figure 28:
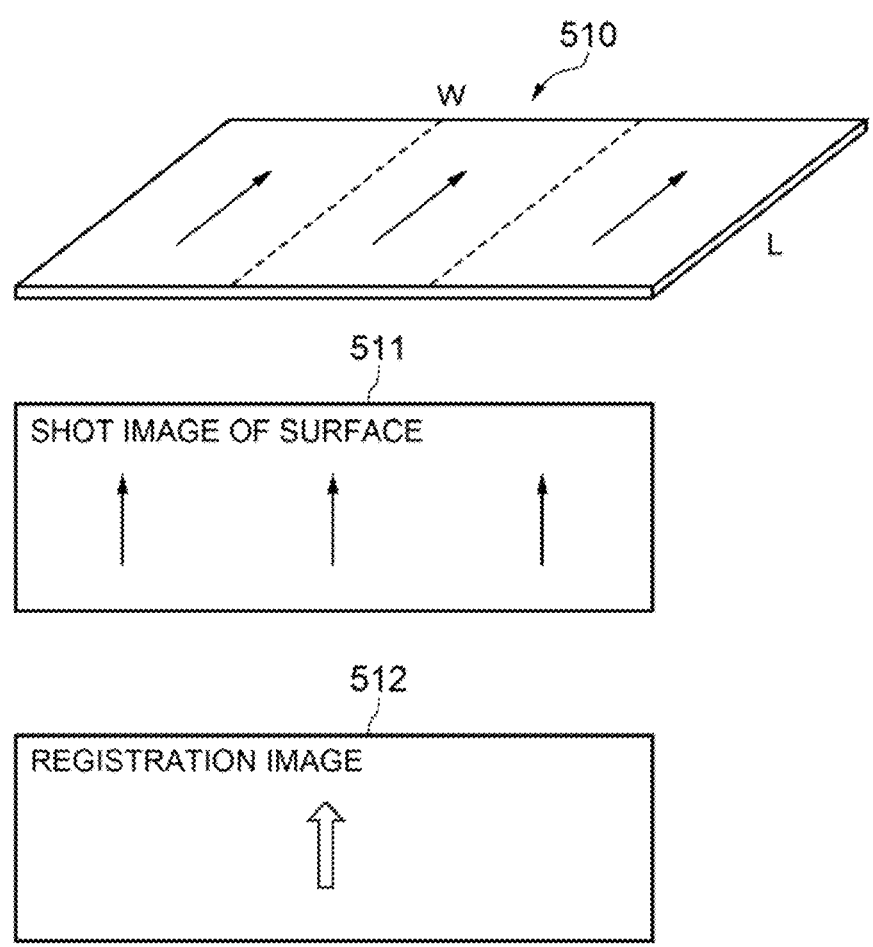
FIG. 28 is a view showing an example of the appearance, predetermined region, and registration image of a component having a flat plate shape to be registered in the second example embodiment of the present invention.

FIG. 28 shows another example of a component to be registered by the registering unit 461. A component 510 in this example is the same component as the component 210 shown in FIG. 5. In this example, a Fourier-Mellin feature image depending on a random pattern unique to component individual is extracted from the entire region of the surface of the component 510. That is to say, a predetermined region of the component 510 is the entire surface.

The image acquiring unit 4611 of the registering unit 461 acquires one shot image 511 obtained by shooting the entire surface of the component 510 with the camera 110 in accordance with an operation by an operator performing a registration work or by an autonomous operation of the registration unit 461. Next, the feature value generating unit 4613 generates a Fourier-Mellin feature image from the shot image 511 by the same method as mentioned above. Then, since the Fourier-Mellin feature image generated by the feature value generating unit 4613 is only one, the image coupling unit 4613 stores the Fourier-Mellin feature image as a registration image 512 into the registration DB 452, for example.

Figure 29:
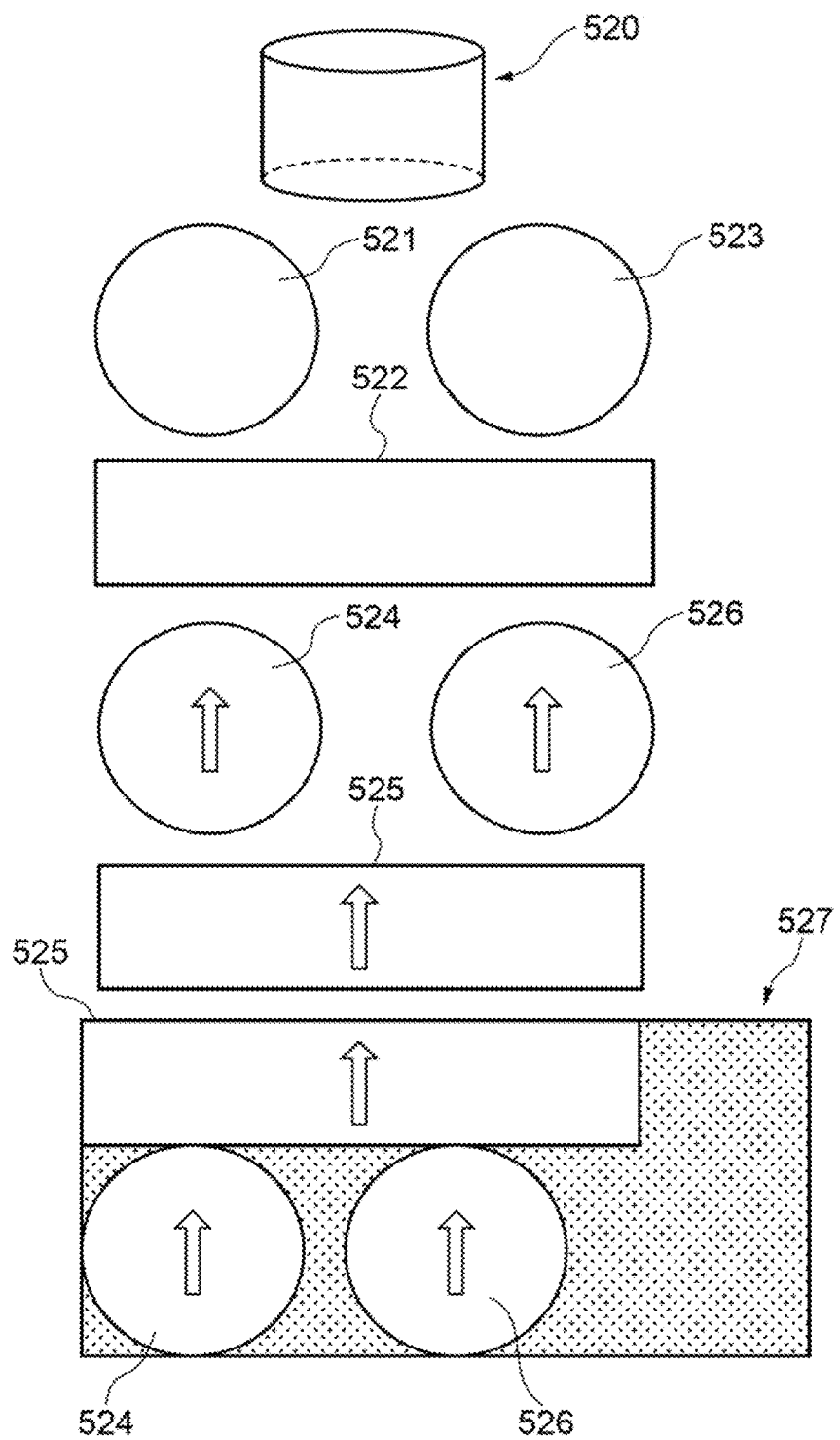
FIG. 29 is a view showing an example of the appearance, predetermined region, and registration image of a component having a cylindrical shape to be registered in the second example embodiment of the present invention.

FIG. 29 shows still another example of a component to be registered by the registering unit 461. A component 520 in this example is the same component as the component 220 shown in FIG. 6. The surface of the component 520 is composed of a total of three faces including an upper face, a lower face, and a side face. In this example, a Fourier-Mellin feature image is extracted from all the regions of the three faces. That is to say, a predetermined region of the component 520 is the entire surface.

The image acquiring unit 4611 of the registering unit 461 acquires a total of three shot images including an upper face shot image 521, a side face shot image 522 covering the entire side face one round or more and a lower face shot image 523 of the component 520 with the camera 410 in accordance with an operation by an operator performing a registration work or by an autonomous operation of the registering unit 461. Next, the feature value generating unit 4613 generates Fourier-Mellin feature images 524, 525 and 526 from the respective shot images 521, 522 and 523 by the same method as mentioned above.

Next, the image coupling unit 4612 generates a registration image 527 that is one image obtained by arranging the three Fourier-Mellin feature images 524 to 526. In this example, the image coupling unit 4612 generates a registration image of specified size by pasting the three Fourier-Mellin feature images on a prepared background image of specified size so as to not overlap each other. The background image is an image in which the values of all the pixels are a predetermined value. As the predetermined value, for example, a zero value may be used. Alternatively, if not affects the random pattern, the predetermined value may be a constant value other than the zero value. In the example of the registration image 527 shown in FIG. 29, the Fourier-Mellin feature image 525 of side face is pasted in the upper region of the background image, and the Fourier-Mellin feature images 524 and 526 of upper and lower faces are pasted in the lower region. In FIG. 29, a dotted region on the registration image 527 indicates a region of pixels having a zero value where no shot image is pasted.

The order and spacing of arrangement of the three Fourier-Mellin feature images 524 to 526 on the background image is freely selected. However, the orientations of the Fourier-Mellin feature images need to be kept in an orientation determined for each same shot image of the same kind of component. Moreover, the plurality of Fourier-Mellin feature images need to not overlap each other.

Subsequently, the matching unit 462 will be described in detail.

Figure 30:
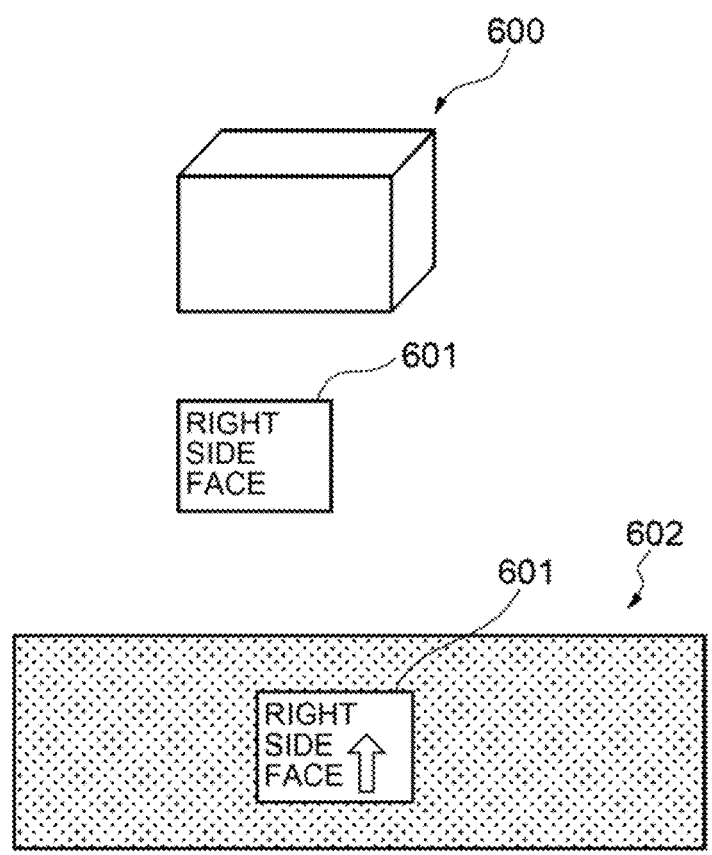
FIG. 30 is a view showing an example of the appearance, part of predetermined region, and matched image of a component having a rectangular parallelepiped shape to be matched in the second example embodiment of the present invention.

FIG. 30 shows an example of a component to be matched by the matching unit 462. A component 600 in this example is the same kind of component as the registration target component 500 shown in FIG. 27.

The image acquiring unit 4621 of the matching unit 462 shoots, for example, the right side face of the component 600 from the front thereof in any orientation with the camera 410 in accordance with an operation by an operator performing a matching work or by an autonomous operation of the matching unit 162, and thereby acquires a shot image 601 obtained by shooting the right side face of the component 600 in any orientation as shown in FIG. 30. Next, the feature value generating unit 4622 generates a Fourier-Mellin feature image 602 from the shot image 601.

Next, the image size increasing unit 4623 increases the size of the Fourier-Mellin feature image 302 to the same size as that of the registration image to generate a matched image 603. In this example, the image size increasing unit 4623 generates, as the matched image 603, an image obtained by pasting the Fourier-Mellin feature image 602 to one background image whose size is the same as that of the registration image and whose all pixels have a predetermined value such as a zero value. A place to paste the Fourier-Mellin feature image 602 is freely selected. However, a direction to paste the Fourier-Mellin feature image 602 needs to be the same as that of the registration image. In the example shown in FIG. 30, the Fourier-Mellin feature image 602 is pasted at almost the center portion of the background image in an orientation that a thick arrow points upward on the sheet of paper.

Next, for each of the registration images stored in the registration DB 452, the determining unit 4624 compares the matched image with the registration image, and thereby calculates a score representing the similarity between the matched image and the registration image by the same method as the determining unit 1624. Next, in a case where a maximum score (a mutual correlation is the maximum) among the scores calculated for the respective registration images stored in the registration DB 452 exceeds a preset determination threshold value, the determining unit 4624 determines that a registration target component specified by a component number stored in association with the registration image of the maximum score in the registration DB 452 is an individual identical to the component 600. In a case where the maximum score does not exceed the determination threshold value, the determining unit 4624 determines that an individual component identical to the component 600 does not exist in the registration DB 152.

In the above description, the image acquiring unit 4621 acquires the shot image 601 of the entire right side face of the component 600. However, even if the image acquiring unit 4621 acquires a shot image of part of the right side face of the component 600 or the whole or part of a face other than the right side face, that is, any face of the upper face, lower face, front side face, back side face, and left side face, the matching unit 462 performs the same operation as when the shot image 601 of the whole right side face is acquired, and it can thereby be determined whether or not the component 600 is an identical individual to nay of the registration target components 500 stored in the registration DB 452. The reason is that Fourier-Mellin feature images extracted from the shot images of the six faces of the registration component 500 are arranged into one image as a registration image and the registration image is registered beforehand in the registration DB 452.

Figure 31:
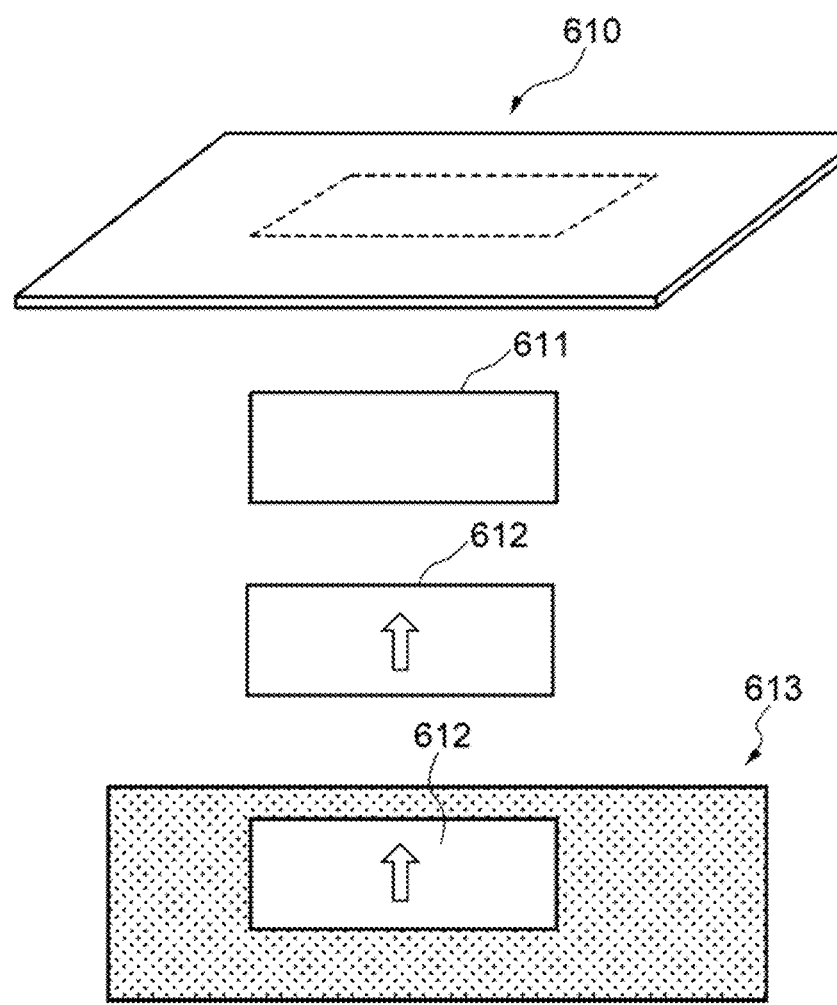
FIG. 31 is a view showing an example of the appearance, part of predetermined region, and matched image of a component having a flat plate shape to be matched in the second example embodiment of the present invention.

FIG. 31 shows another example of a component to be matched by the matching unit 462. A component 610 in this example is the same kind of component as the component 510 shown in FIG. 28.

The image acquiring unit 4621 of the matching unit 462 shoots, for example, a center portion of the upper face of the component 610 from the front thereof in any orientation with the camera 410 in accordance with an operation by an operator performing a matching work or by an autonomous operation of the matching unit 162, and thereby acquires a shot image 611 as shown in FIG. 31. Next, the feature value generating unit 4622 generates a Fourier-Mellin feature image 612 from the shot image 611.

Next, the image size increasing unit 4623 increases the size of the Fourier-Mellin feature image 312 to the same size as that of the registration image to generate a matched image 613. In this example, the image size increasing unit 4623 generates, as the matched image 613, an image obtained by pasting the Fourier-Mellin feature image 612 to one background image whose size is the same as that of the registration image and whose all pixels have a predetermined value such as a zero value. A place to paste the Fourier-Mellin feature image 612 is freely selected. However, a direction to paste the Fourier-Mellin feature image 612 needs to be the same as that of the registration image. In the example shown in FIG. 31, the Fourier-Mellin feature image 612 is pasted at the center portion of the background image in an orientation that a thick arrow points upward on the sheet of paper.

Next, for each of the registration images stored in the registration DB 452, the determining unit 4624 compares the matched image with the registration image and thereby calculates a score representing the similarity between the matched image and the registration image. Then, the determining unit 4624 determines whether or not the component 610 is an individual identical to any of the components stored in the registration DB 452 based on the score calculated for each of the registration images, and outputs the result.

In the above description, the image acquiring unit 4621 acquires part of the center portion of the upper face of the component 610 as the shot image 611. However, even if the image acquiring unit 4621 acquires a shot image of a region other than the center portion of the upper face of the component 610, for example, a region such as the left side or right side of the upper face in accordance with an operation by an operator performing the matching work, the matching unit 462 performs the same operation as when the shot image 611 of the center portion of the upper face is acquired, and it can thereby be determined whether or not the component 610 is an identical individual to any of the registration target components 510 stored in the registration DB 452.

Figure 32:
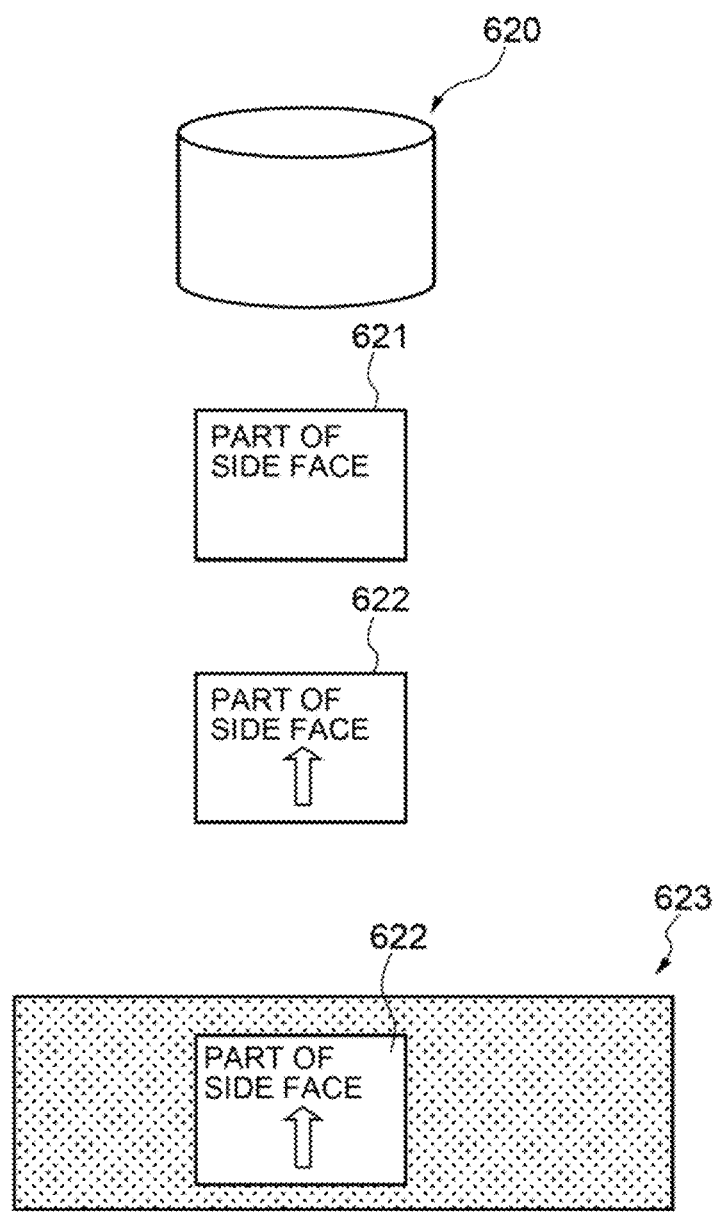
FIG. 32 is a view showing an example of the appearance, part of predetermined region, and matched image of a component having a cylindrical shape to be matched in the second example embodiment of the present invention.

FIG. 32 shows still another example of a component to be matched by the matching unit 462. A component 620 in this example is the same kind of component as the registration target component 520 shown in FIG. 29.

The image acquiring unit 4621 of the matching unit 462 shoots, for example, part of the side face of the component 620 in any orientation with the camera 410 in accordance with an operation by an operator performing a matching work or by an autonomous operation of the matching unit 462, and thereby acquires a shot image 621 as shown in FIG. 32. Next, the feature value generating unit 4622 generates a Fourier-Mellin feature image 622 from the shot image 621.

Next, the image size increasing unit 4623 increases the size of the Fourier-Mellin feature image 322 to the same size as that of the registration image to generate a matched image 623. In this example, the image size increasing unit 4623 generates, as the matched image 623, an image obtained by pasting the Fourier-Mellin feature image 622 to one background image whose size is the same as that of the registration image and whose all pixels have a predetermined value such as a zero value. A place to paste the Fourier-Mellin feature image 622 is freely selected. However, an orientation to paste the Fourier-Mellin feature image 622 needs to be the same as that of the registration image. In the example shown in FIG. 32, the Fourier-Mellin feature image 622 is pasted at the center portion of the background image in an orientation that a thick arrow points upward on the sheet of paper.

Next, for each of the registration images stored in the registration DB 452, the determining unit 4624 compares the matched image 623 with the registration image and thereby calculates a score representing the similarity between the matched image 623 and the registration image. Then, the determining unit 4624 determines whether or not the component 620 is an identical individual to any of the components stored in the registration DB 452 based on the scores calculated for the respective registration images, and outputs the result.

In the above description, the image acquiring unit 4621 acquires part of the side face of the component 620 as the shot image 621. However, even when the image acquiring unit 4621 acquires a shot image of a portion other than the side face of the component 620 or the upper face or lower face of the component 620, the matching unit 462 performs the same operation as when the shot image 621 is acquired, and it can thereby be determined whether or not the component 620 is an identical individual to any of the registration target components 520 stored in the registration DB 452.

As described above, according to this example embodiment, the same effect as in the first example embodiment can be obtained, and the following effect can also be obtained. That is to say, in this example embodiment, a Fourier-Mellin feature image generated from a shot image of a registration target component and a Fourier-Mellin feature image generated from a shot image of a matching target component are compared and the identify between the matching target component and the registration target component is determined, so that it is possible to perform robust individual identification against translation, rotation, and scale variation.

Third Example Embodiment

Figure 33:
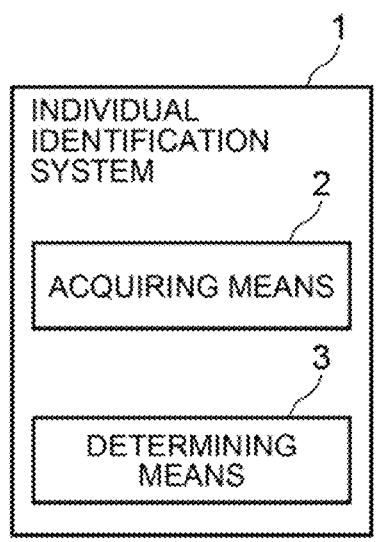
FIG. 33 is a block diagram of an individual identification system according to the second example embodiment of the present invention.

Next, a third example embodiment of the present invention will be described with reference to FIG. 33. FIG. 33 is a block diagram of an individual identification system according to this example embodiment.

Referring to FIG. 33, an individual identification system 1 according to this example embodiment includes an acquiring means 2 and a determining means 3.

The acquiring means 2 is configured to acquire a matched image obtained by shooting part of a predetermined region of a matching target object. The acquiring means 2 can be configured, for example, in the same manner as the image acquiring unit 1621 shown in FIG. 1 or the image acquiring unit 4621 shown in FIG. 24, but is not limited thereto.

The determining means 3 is configured to calculate a score representing a degree that a partial image similar to the matched image acquired by the acquiring means 2 exists in a registration image obtained by shooting a predetermined region of a registration target object. The determining means 3 is also configured to determine based on the score whether or not the matching target object is identical to the registration target object. The determining means 3 can be configured, for example, in the same manner as the determining unit 1624 shown in FIG. 1 or the determining unit 4624 shown in FIG. 24, but is not limited thereto.

The individual identification system 1 thus configured operates in the following manner. That is to say, first, the acquiring means 2 acquires a matched image obtained by shooting part of a predetermined region of a matching target object. Next, the determining means 3 calculates a score representing a degree that a partial image similar to the matched image acquired by the acquiring means 2 exists in a registration image obtained by shooting a predetermined region of a registration target object, and determine based on the score whether or not the matching target object is identical to the registration target object.

According to the individual identification system 1 configured and operating in the above manner, it is possible to increase the convenience of an individual identification system that determines whether or not a matching target object is identical to a registration target object. The reason is as follows. The individual identification system 1 includes the acquiring means 2 that acquires a matched image obtained by shooting part of a predetermined region of a matching target object, and the determining means 3 that calculates a score representing a degree that a partial image similar to the matched image acquired by the acquiring means 2 exists in a registration image obtained by shooting a predetermined region of a registration target object and determines based on the score whether or not the matching target object is identical to the registration target object. At the time of matching, it is not necessary to shoot the whole of a predetermined region of a component, and it is enough to shoot part of the predetermined region.

Although the present invention has been described above with reference to the example embodiments, the present invention is not limited to the example embodiments. The configurations and details of the present invention can be changed in various manners that can be understood by one skilled in the art within the scope of the present invention. For example, the present invention also includes the following aspects.

Figure 34:
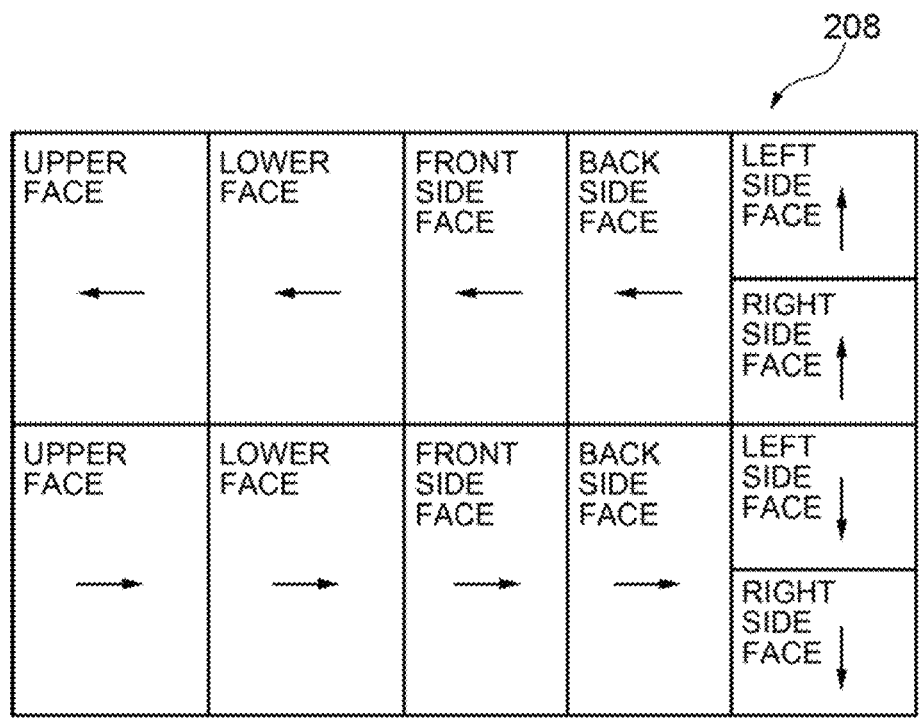
FIG. 34 is a view showing an example of a registration image in another example embodiment of the present invention.

For example, at the time of generating one registration image by arranging the shot images of the faces of a registration target object, a plurality of the same shot images may be arranged in different orientations. For example, in the case of the component 200 having a rectangular parallelepiped shape shown in FIG. 4, a plurality of at least one of the upper face shot image 201, the lower face shot image 202, the front side face shot image 203, the back side face shot image 204, the left side face shot image 205 and the right side face shot image 206 may be arranged so that the orientations are different from each other as illustrated in FIG. 34. With this, also in the first example embodiment, robust individual identification against the orientations of images becomes possible as in the second example embodiment.

Figure 35:
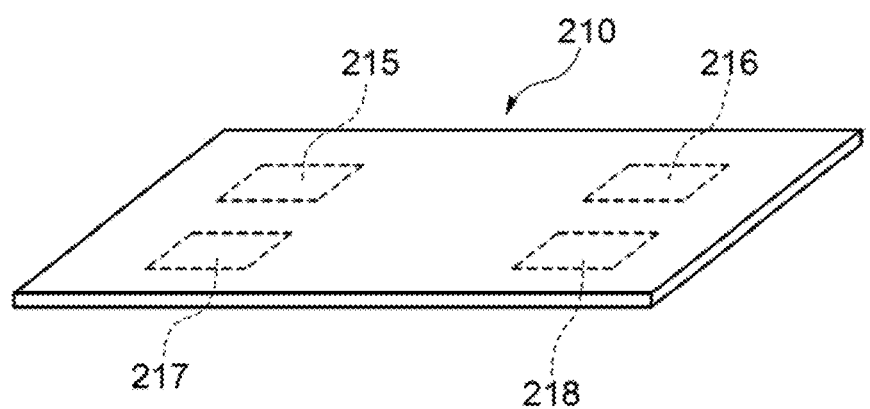
FIG. 35 is a view showing an example of a predetermined region of a registration target object in another example embodiment of the present invention.

Further, a predetermined region of a registration target object may be a set of a plurality of subregions existing at locations spatially away from each other on the same face of the registration target object. For example, as shown in FIG. 35, a plurality of subregions 215 to 218 that are provided in different positions from each other on the surface of the component 210 having a flat plate shape and having a predetermined shape (for example, a rectangle) and have a predetermined size may be the predetermined region. In this case, in the first example embodiment, one image obtained by arranging the shot images of the subregions 215 to 218 is the registration image. In the second example embodiment, one image obtained by arranging the Fourier-Mellin feature images of the shot images of the subregions 215 to 218 is the registration image.

The present invention can be used in the field of matching two images, and in particular, can be used in the field of individual identification and management of individual products by acquiring an image of spontaneous differences of fine patterns that occur in the same manufacturing process, such as fine irregularities and patterns on the surface of a product and random patterns on the surface of a material by using a shooting device such as a camera and recognizing the fine patterns. Moreover, without limiting to products, the present invention can be used in the field of authentication of a person or individual identification and management of living things by acquiring an image of a difference in surface fine patterns of living things such as human person's fingerprints and recognizing the fine patterns.

The whole or part of the example embodiments disclosed above can be described as, but not limited to, the following supplementary notes.

Supplementary Note 1

An individual identification system comprising:
  an acquiring means configured to acquire a matched image obtained by shooting part of a predetermined region of a matching target object; and
  a determining means configured to calculate a score representing a degree to which a partial image similar to the matched image exists in a registration image obtained by shooting a predetermined region of a registration target object, and determine based on the score whether or not the matching target object is identical to the registration target object.

Supplementary Note 2

The individual identification system according to Supplementary Note 1, wherein
  the registration image is a composite image obtained by arranging, into one image, a plurality of images obtained by shooting a plurality of mutually different faces of the registration target object or a plurality of images obtained by shooting a plurality of subregions existing at places spatially away from each other on an identical face of the registration target object.

Supplementary Note 3

The individual identification system according to Supplementary Note 2, wherein
  the plurality of images are pasted onto a background image in which a value of each pixel is a predetermined value.

Supplementary Note 4

The individual identification system according to Supplementary Note 2 or 3, wherein
  at least one image among the plurality of images obtained by shooting the plurality of faces is an image that covers an entire circumference of the registration target object one round or more.

Supplementary Note 5

The individual identification system according to any of Supplementary Notes 2 to 4, further comprising
  a generating means configured to acquire a plurality of images obtained by shooting a plurality of mutually different faces of the registration target object or a plurality of images obtained by shooting a plurality of subregions existing at places spatially away from each other on an identical face of the registration target object, and generate the registration image from the plurality of acquired images.

Supplementary Note 6

The individual identification system according to any of Supplementary Notes 1 to 5, wherein
  the determining means is configured to enlarge the matched image to a same size as that of the registration image, and calculate the score based on a synthesized frequency feature obtained by synthesizing a frequency feature of the enlarged matched image and a frequency feature of the registration image.

Supplementary Note 7

The individual identification system according to Supplementary Note 1, wherein
  the registration image is a composite image obtained by arranging, into one image, a plurality of Fourier-Mellin feature images obtained by performing Fourier-Mellin transform on a plurality of images obtained by shooting a plurality of mutually different faces of the registration target object or a plurality of images obtained by shooting a plurality of subregions existing at places spatially away from each other on an identical face of the registration target object.

Supplementary Note 8

The individual identification system according to Supplementary Note 7, wherein
  the plurality of Fourier-Mellin feature images are pasted onto a background image in which a value of each pixel is a predetermined value.

Supplementary Note 9

The individual identification system according to Supplementary Note 7 or 8, wherein
  at least one image among the plurality of images obtained by shooting the plurality of faces is an image that covers an entire circumference of the registration target object one round or more.

Supplementary Note 10

The individual identification system according to any of Supplementary Notes 7 to 9, further comprising
  a generating means configured to acquire a plurality of images obtained by shooting a plurality of mutually different faces of the registration target object or a plurality of images obtained by shooting a plurality of subregions existing at places spatially away from each other on an identical face of the registration target object, perform Fourier-Mellin transform on the plurality of acquired images to generate a plurality of Fourier-Mellin feature images, and generate the registration image from the plurality of generated Fourier-Mellin feature images.

Supplementary Note 11

The individual identification system according to Supplementary Note 1, 7, 8, 9 or 10, wherein
the determining means is configured to enlarge a Fourier-Mellin feature image obtained by performing Fourier-Mellin transform on the matched image to a same size as that of a Fourier-Mellin feature image obtained by performing Fourier-Mellin transform on the registration image, and calculate the score based on a result of comparison between the enlarged Fourier-Mellin feature image of the matched image and the Fourier-Mellin feature image of the registration image.

Supplementary Note 12

An individual identification method comprising:
acquiring a matched image obtained by shooting part of a predetermined region of a matching target object;
calculating a score representing a degree to which a partial image similar to the matched image exists in a registration image obtained by shooting a predetermined region of a registration target object; and
determining based on the score whether or not the matching target object is identical to the registration target object.

Supplementary Note 13

The individual identification method according to Supplementary Note 12, wherein
the registration image is a composite image obtained by arranging, into one image, a plurality of images obtained by shooting a plurality of mutually different faces of the registration target object or a plurality of images obtained by shooting a plurality of subregions existing at places spatially away from each other on an identical face of the registration target object.

Supplementary Note 14

The individual identification method according to Supplementary Note 12, wherein
the plurality of images are pasted onto a background image in which a value of each pixel is a predetermined value.

Supplementary Note 15

The individual identification method according to Supplementary Note 14, wherein
at least one image among the plurality of images obtained by shooting the plurality of faces is an image that covers an entire circumference of the registration target object one round or more.

Supplementary Note 16

The individual identification method according to any of Supplementary Notes 12 to 15, further comprising
generating the registration image from a plurality of images obtained by shooting a plurality of mutually different faces of the registration target object or a plurality of images obtained by shooting a plurality of subregions existing at places spatially away from each other on an identical face of the registration target object.

Supplementary Note 17

The individual identification method according to any of Supplementary Notes 12 to 16, comprising
in calculating the score, enlarging the matched image to a same size as that of the registration image, and calculating the score based on a synthesized frequency feature obtained by synthesizing a frequency feature of the enlarged matched image and a frequency feature of the registration image.

Supplementary Note 18

The individual identification method according to Supplementary Note 12, wherein
the registration image is a composite image obtained by arranging, into one image, a plurality of Fourier-Mellin feature images obtained by performing Fourier-Mellin transform on a plurality of images obtained by shooting a plurality of mutually different faces of the registration target object or a plurality of images obtained by shooting a plurality of subregions existing at places spatially away from each other on an identical face of the registration target object.

Supplementary Note 19

The individual identification method according to Supplementary Note 12, wherein
the plurality of Fourier-Mellin feature images are pasted onto a background image in which a value of each pixel is a predetermined value.

Supplementary Note 20

The individual identification method according to Supplementary Note 18 or 19, wherein
at least one image among the plurality of images obtained by shooting the plurality of faces is an image that covers an entire circumference of the registration target object one round or more.

Supplementary Note 21

The individual identification method according to any of Supplementary Notes 18 to 20, further comprising
acquiring a plurality of images obtained by shooting a plurality of mutually different faces of the registration target object or a plurality of images obtained by shooting a plurality of subregions existing at places spatially away from each other on an identical face of the registration target object, performing Fourier-Mellin transform on the plurality of acquired images to generate a plurality of Fourier-Mellin feature images, and generating the registration image from the plurality of generated Fourier-Mellin feature images.

Supplementary Note 22

The individual identification method according to Supplementary Note 12, 18, 19, 20 or 21, comprising
in calculating the score, enlarging a Fourier-Mellin feature image obtained by performing Fourier-Mellin transform on the matched image to a same size as that of a Fourier-Mellin feature image obtained by performing Fourier-Mellin transform on the registration image, and calculating the score based on a result of comparison between the enlarged Fourier-Mellin feature image of the matched image and the Fourier-Mellin feature image of the registration image.

Supplementary Note 23

A non-transitory computer-readable recording medium having a program recorded thereon, the program comprising instructions for causing a computer to perform:
a process of acquiring a matched image obtained by shooting part of a predetermined region of a matching target object;
a process of calculating a score representing a degree to which a partial image similar to the matched image exists in a registration image obtained by shooting a predetermined region of a registration target object; and
a process of determining based on the score whether or not the matching target object is identical to the registration target object.

DESCRIPTION OF NUMERALS

- 100 individual identification apparatus
- 110 camera
- 120 communication I/F unit
- 130 operation input unit
- 140 screen display unit
- 150 storing unit
- 151 program
- 152 registration DB
- 160 arithmetic processing unit
- 161 registering unit
- 1611 image acquiring unit
- 1612 image coupling unit
- 1613 feature value generating unit
- 162 matching unit
- 1621 image acquiring unit
- 1622 image size increasing unit
- 1623 feature value generating unit
- 1624 determining unit

What is claimed is:

1. An individual identification system having a registration phase and an operation phase, the individual identification system comprising:
a memory containing program instructions; and
a processor coupled to the memory, wherein the processor is configured to execute the program instructions to:
in the registration phrase:
acquire a plurality of images obtained by shooting a plurality of mutually different faces of a registration target object, or a plurality of images obtained by shooting a plurality of subregions that are spatially away from each other on an identical face of the registration target object, as a plurality of first images of the registration target object;
generate one composite image by pasting a plurality of a second images onto a background image in which a value of each pixel is a predetermined value, the plurality of the second images being the plurality of the first images or a plurality of Fourier-Mellin feature images obtained by performing Fourier-Mellin transform on the first images;
store the generated composition image as a registration image;
in the matching phase:
acquire a matching image obtained by shooting part of a predetermined region of a matching target object;
enlarge the matching image or a Fourier-Mellin feature image obtained by performing a Fourier-Mellin transform on the matching image to a same size as a size of the registration image;
calculate a score representing a degree to which a partial image similar to the matched image exists in the registration image based on a synthesized frequency feature obtained by synthesizing a frequency feature of the enlarged matching image and a frequency feature of the registration image; and
determine whether or not the matching target object is identical to the registration target object based on the score.

2. The individual identification system according to claim 1, wherein
at least one image among the plurality of images obtained by shooting the plurality of mutually different faces is an image that covers an entire circumference of the registration target object.

3. An individual identification method having a registration phase and an operation phase, the individual identification method performed by a computer and comprising:
in the registration phrase:
acquiring a plurality of images obtained by shooting a plurality of mutually different faces of a registration target object, or a plurality of images obtained by shooting a plurality of subregions that are spatially away from each other on an identical face of the registration target object, as a plurality of first images of the registration target object;
generating one composite image by pasting a plurality of a second images onto a background image in which a value of each pixel is a predetermined value, the plurality of the second images being the plurality of the first images or a plurality of Fourier-Mellin feature images obtained by performing Fourier-Mellin transform on the first images;
storing the generated composition image as a registration image;
in the matching phase:
acquiring a matching image obtained by shooting part of a predetermined region of a matching target object;
enlarging the matching image or a Fourier-Mellin feature image obtained by performing a Fourier-Mellin transform on the matching image to a same size as a size of the registration image;
calculating a score representing a degree to which a partial image similar to the matched image exists in the registration image based on a synthesized frequency feature obtained by synthesizing a frequency feature of the enlarged matching image and a frequency feature of the registration image; and
determining whether or not the matching target object is identical to the registration target object based on the score.

4. The individual identification method according to claim 3, wherein
at least one image among the plurality of images obtained by shooting the plurality of mutually different faces is an image that covers an entire circumference of the registration target object.

5. A non-transitory computer-readable recording medium storing a program having a registration phase and an operation phase, the program executable by a computer to perform processing comprising:
in the registration phrase:
acquiring a plurality of images obtained by shooting a plurality of mutually different faces of a registration target object, or a plurality of images obtained by shooting a plurality of subregions that are spatially away from each other on an identical face of the registration target object, as a plurality of first images of the registration target object;
generating one composite image by pasting a plurality of a second images onto a background image in which a value of each pixel is a predetermined value, the plurality of the second images being the plurality of the first images or a plurality of Fourier-Mellin feature images obtained by performing Fourier-Mellin transform on the first images;
storing the generated composition image as a registration image;
in the matching phase:
acquiring a matching image obtained by shooting part of a predetermined region of a matching target object;
enlarging the matching image or a Fourier-Mellin feature image obtained by performing a Fourier-Mellin transform on the matching image to a same size as a size of the registration image;
calculating a score representing a degree to which a partial image similar to the matched image exists in the registration image based on a synthesized frequency feature obtained by synthesizing a frequency feature of the enlarged matching image and a frequency feature of the registration image; and
determining whether or not the matching target object is identical to the registration target object based on the score.

\* \* \* \* \*